US011494504B2

(12) United States Patent
Phillips et al.

(10) Patent No.: US 11,494,504 B2
(45) Date of Patent: Nov. 8, 2022

(54) ACCESS TO DATA IN MULTIPLE INSTANCES THROUGH A SINGLE RECORD

(71) Applicant: salesforce.com, inc., San Francisco, CA (US)

(72) Inventors: Robert Phillips, Atlanta, GA (US); Joshua Siegel, Atlanta, GA (US)

(73) Assignee: Salesforce, Inc., San Francisco, CA (US)

( * ) Notice: Subject to any disclaimer, the term of this patent is extended or adjusted under 35 U.S.C. 154(b) by 134 days.

(21) Appl. No.: 16/169,235

(22) Filed: Oct. 24, 2018

(65) Prior Publication Data
US 2020/0097672 A1 Mar. 26, 2020

Related U.S. Application Data

(60) Provisional application No. 62/735,422, filed on Sep. 24, 2018.

(51) Int. Cl.
| | |
|---|---|
| *H04L 9/40* | (2022.01) |
| *G06Q 10/10* | (2012.01) |
| *G06F 21/62* | (2013.01) |
| *G06F 21/60* | (2013.01) |
| *G06F 9/451* | (2018.01) |
| *G06F 16/25* | (2019.01) |

(52) U.S. Cl.
CPC .......... *G06F 21/6218* (2013.01); *G06F 9/451* (2018.02); *G06F 16/252* (2019.01); *G06F 21/604* (2013.01); *G06Q 10/105* (2013.01); *H04L 63/08* (2013.01); *G06F 2221/2141* (2013.01)

(58) Field of Classification Search
CPC .... G06F 21/6218; G06F 21/604; G06F 9/451; G06F 16/252; G06F 2221/2141; H04L 63/08; G06Q 10/105
See application file for complete search history.

(56) References Cited

U.S. PATENT DOCUMENTS

| | | | | |
|---|---|---|---|---|
| 8,600,799 | B2 * | 12/2013 | Chang | G06Q 10/00 705/7.42 |
| 8,782,676 | B2 * | 7/2014 | Dokovski | G06F 9/545 719/329 |
| 10,013,529 | B1 * | 7/2018 | Swanson | G06F 21/41 |
| 10,747,399 | B1 * | 8/2020 | Young | G06F 3/0482 |

(Continued)

*Primary Examiner* — Daniel B Potratz
(74) *Attorney, Agent, or Firm* — Butzel Long

(57) ABSTRACT

Systems, devices, and techniques are disclosed access to data in multiple instances through a single record. A selection of a record may be received through a user interface. The record may be stored in a database. Aspects of the record may be received from the first database. and displayed on the user interface. A first additional aspect associated with the record may be received from a first instance database associated with a first instance of a secondary application and displayed on the user interface. A selection to switch to a second instance of the secondary application may be received through the user interface. A second additional aspect associated with the record may be received from a second instance database associated with the second instance of the secondary application and displayed on the user interface the in place of the first additional aspect associated with the record from the database.

16 Claims, 24 Drawing Sheets

(56) References Cited

U.S. PATENT DOCUMENTS

| | | | | |
|---|---|---|---|---|
| 2011/0055291 A1* | 3/2011 | Henderson | ............ | G06F 16/252 |
| | | | | 707/808 |
| 2016/0127358 A1* | 5/2016 | Engelking | ........... | H04W 12/088 |
| | | | | 713/156 |
| 2017/0322971 A1* | 11/2017 | Seshadri | ............. | G06F 16/9038 |
| 2019/0197153 A1* | 6/2019 | Brewinski | ........... | G06F 16/2456 |

* cited by examiner

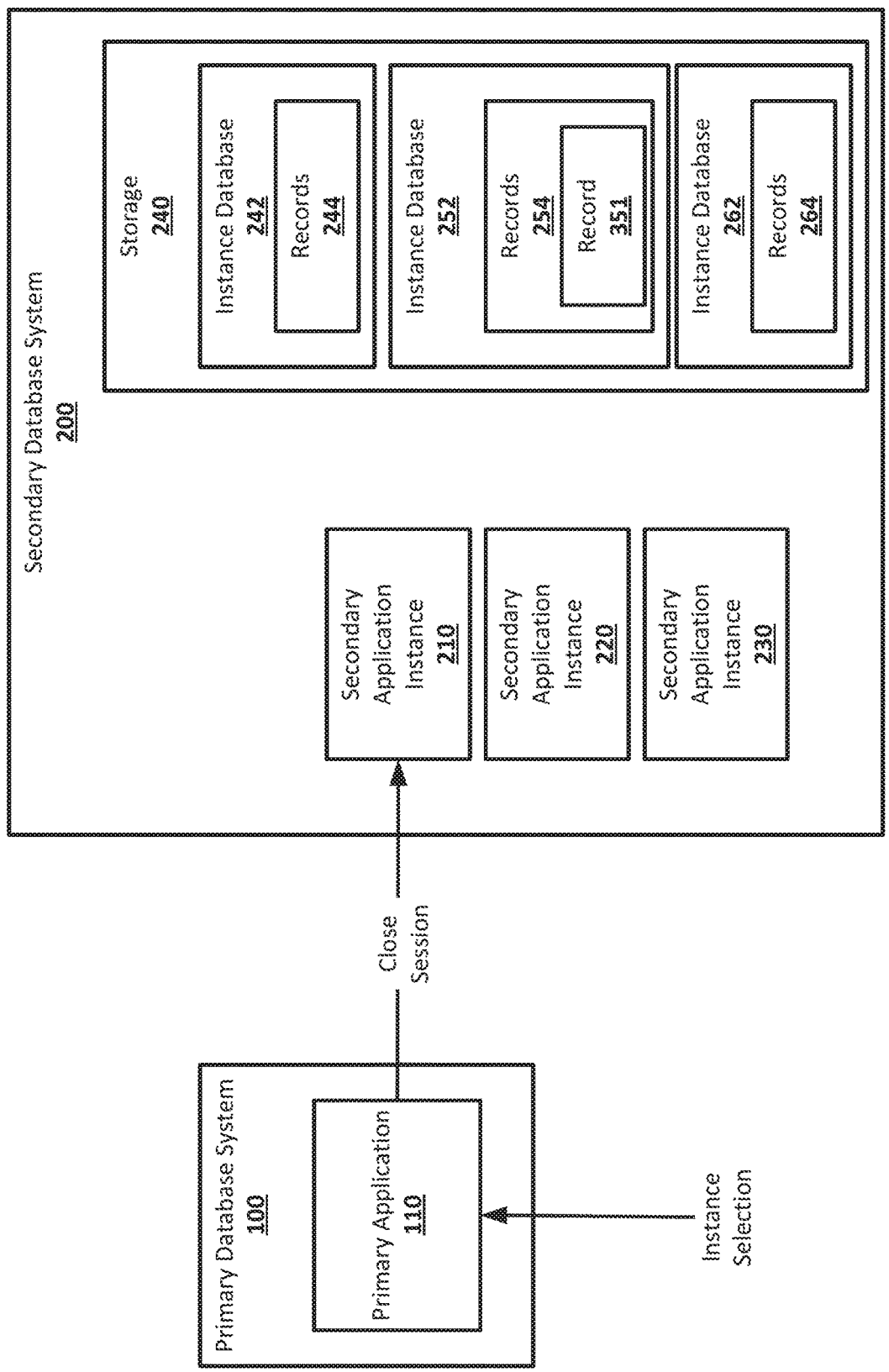

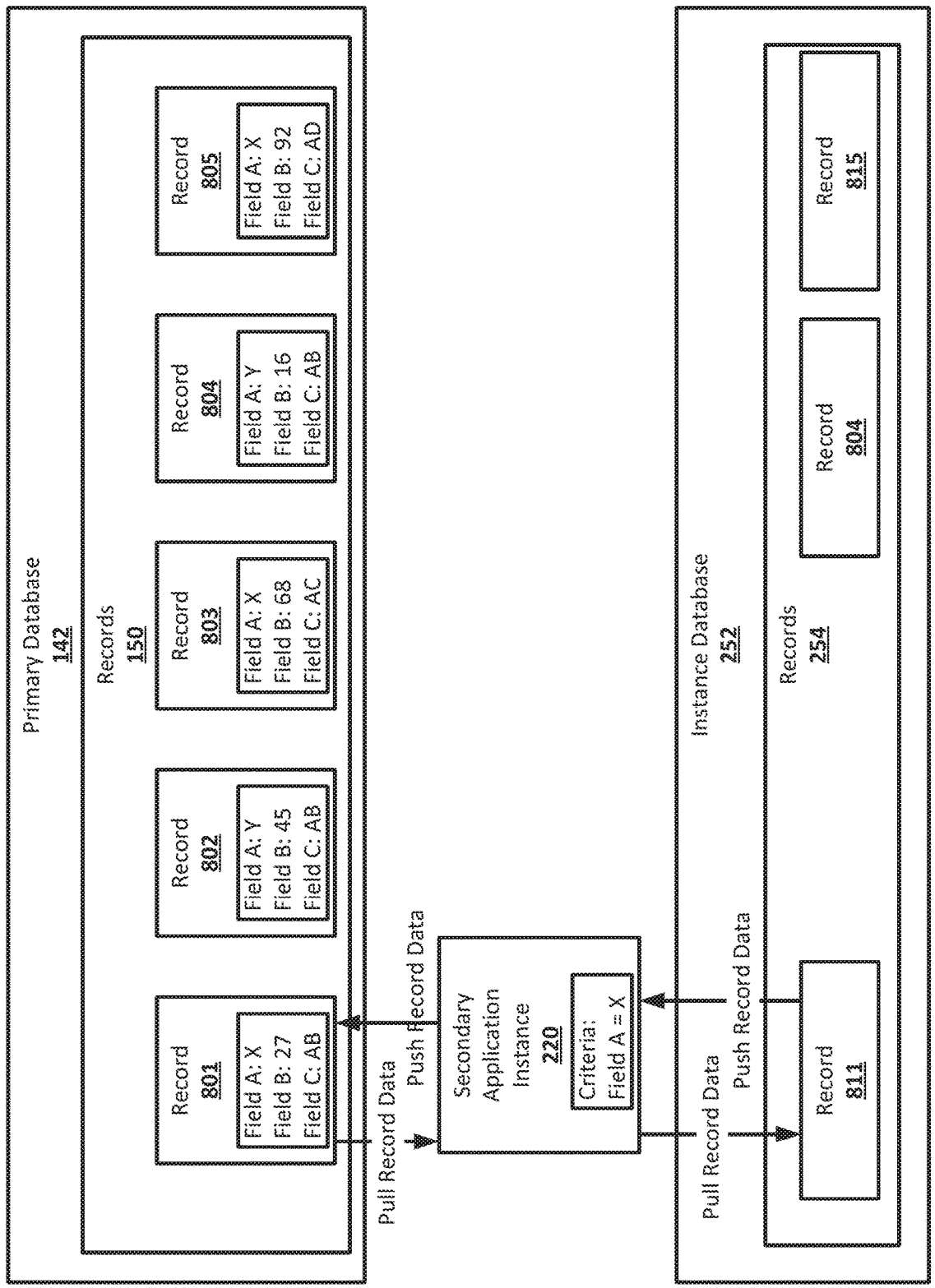

ACCESS TO DATA IN MULTIPLE INSTANCES THROUGH A SINGLE RECORD

BACKGROUND

Contact records stored in a database used by an organization may be used by multiple separate units within that organization. Each unit may have its own data for use with a contact record that may separate from the set of data used by any other unit within the organization. Each unit may need to work with its own set of data for a contact record when working with the contact record. The units may maintain their own data instances separate from the database. This may result in a copy of the contact record being stored in the database used by the organization for each unit of the organization that has separate data for the record in order to maintain separation between the different unit's data.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 5D shows an example arrangement suitable for access to data in multiple instances through a single record according to an implementation of the disclosed subject matter.

FIG. 12A shows an example arrangement for access to data in multiple instances through a single record according to an implementation of the disclosed subject matter

DETAILED DESCRIPTION

Figure 2:
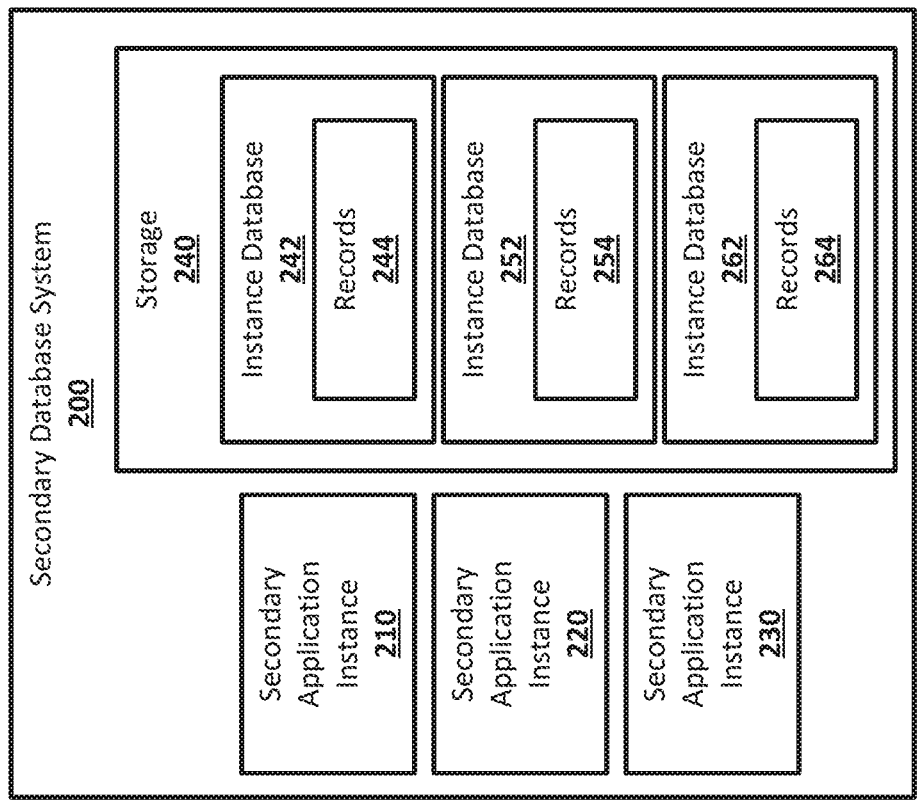
FIG. 2 shows an example system for access to data in multiple instances through a single record according to an implementation of the disclosed subject matter.

Techniques disclosed herein enable access to data in multiple instances through a single record. A primary database that is a part of a primary database system may store records, such as contact records. A user interface may be part of a primary application associated with the primary database and may be used to access and display data from the records. Multiple instances of a secondary application that interfaces with the primary database may be associated with data associated with records in the primary database. The data associated with the multiple instances of the secondary application may be stored as records in instance databases that are part of a secondary database system. Each instance of the secondary application may have its own instance database, and multiple instance databases may store records with data that is associated with the same record in the primary database. When the user interface is used to access a record from the primary database, a user session may be established between an instance of the secondary application and the primary application. The primary application may use the user session to retrieve records with data associated with the accessed record from the instance database for the instance of the secondary application. The data associated with the accessed record from the primary database may be displayed on the user interface along with data for the record from the primary database. The user interface of the primary application may then be used to select a different instance of the secondary application. The primary application may end its session with the current instance of the secondary application, which may become the previous instance of the secondary application, and then may establish a session with the instance of the secondary application that was selected through the user interface, which may become the current instance of the secondary application. The primary application may use the user session to retrieve records with data associated with the accessed record from the instance database for the current instance of the secondary application. The data associated with the accessed record from the primary database may be displayed on the user interface along with data for the record from the primary database, replacing the previously displayed data that was retrieved from the instance database for the previous instance of the application. The user interface may be used to select any instance of the secondary application that has an instance database storing data associating with the accessed record from the primary database, in order to display that data on the user interface A primary database of a primary database system may store records. The primary database system may be any suitable database system using any suitable hardware and software for storing and allowing access to a database. The primary database system may store multiple databases. For example, the primary database system may be multi-tenanted, and the primary database may be owned by a specific tenant of the multi-tenanted database system. Multi-tenancy may allow various tenants, which may be, for example, users, groups of users, or organizations, to access their own records in the primary database system through software tools or instances on the database system that may be shared among the various tenants. The records for each tenant may be part of a primary database for that tenant.

The records stored in a primary database may be any suitable records storing any suitable data about aspects of the record. The records may be, for example, contact records. A contact record may store contact information, which include data about aspects such as names, titles, phone numbers, email addresses, user identifiers for communication services, physical addresses, and organizational data, for an entity such as an individual, group, business, or organization.

The primary database system may include a user interface that may be used to interact with the primary database system and the primary database. The user interface may be made available in any suitable manner. For example, the user interface may be a web-based front-end hosted on a server system that is part of, or connected to, the primary database system. The user interface may be part of an application that may be run on computing devices separate from the primary database system and may connect to the primary database system in any suitable manner using any suitable communications channels.

A user may use the user interface to retrieve, view, and modify records from the primary database. For example, the user may belong to an organization that is a tenant of the primary database system. The user may, for example, select a record from the primary database to display data from in the user interface. For example, the primary database may store contact records for the organization, and the user may select a contact record to display data from in the user interface. Data from the contact record, which describe aspects of the contact, may include, for example, the name of the contact, phone number for the contact, email address for the contact, and company the contact is employed by.

An entity that is a tenant of the primary database system may also be a tenant of a secondary database system. The secondary database system may be separate from the primary database system. The secondary database system may store multiple instance databases, which may be databases for instances of a secondary application that may be used to interact with the secondary database system. The instance databases in the secondary database system may store records with data associated with the records stored in the primary database on the primary database system. The records in each instance database may store a variation of the same type of data associated with the records stored in the primary database. For example, each instance database may store records that include scores or other evaluations, and data related to such evaluations, assigned to contacts for which contact records are stored in the primary database. A record in an instance database may be linked in any suitable manner to a record in the primary database for which the record in the instance database include data about. For example, a record in an instance database may be synced to a record in a primary database. The syncing of records may allow, for example, updates to common aspects of the data in the records to be shared between the records. For example, when an email address in a record in an instance database is updated, the same update may be made to the record in the primary database that is synced to the record in the instance database.

Instance databases that store data of the same data type for the same record in the primary database may store different versions of that data. For example, a first instance database may store a score for a contact from a contact record in the primary database, and the second instance database may store a different score for that same contact from the same contact record. The scores may be, for example, different scores assigned by different business units of an organization that uses the secondary database system. The different business units may use different instances of the secondary application to interact with their instance databases in the secondary database system, as each business unit may have its own set of records stored in its own instance database. This may allow for separation between data from each business unit that that is associated same record in the primary database. Accounts used to access the instance databases on the secondary database system may be connected to the primary database that stores the records for which the instance databases store associated data.

A user may use the user interface of the primary database system to select a record from the primary database. The user may have access to both the primary database and to multiple instance databases stored in the secondary database system. The primary application may retrieve the selected record from the primary database and display data from the primary record on the user interface. For example, the record may be a contact record, and the primary application may retrieve and display the name, phone number, email address, and employer stored in the contact record on the user interface.

After selecting a record, the user may use the user interface of the primary database system to select an instance of the secondary application. The user interface of the primary database system may display the instances of the secondary application that are available for selection, as the accounts used to access the instance databases for those instances of the secondary application may be connected to the primary database. For example, multiple business units in an organization that owns the primary database may have instance databases in the secondary database system associated with their own instances of the secondary application. The user interface may display, for example, the names of the business units, and a user may select a business unit in order to display data from the business unit's instance database for the selected record from the primary database.

On receiving a selection of an instance of the secondary application from the user, the primary application may open a session with the selected instance of the secondary application. The session may be opened using, for example, credentials that the user has previously entered into the primary application, or credentials that are attached to the user's session with the primary application. The primary application may then request, from the instance of the secondary application, the record in the instance database for the instance of the secondary application that includes data associated with the record the user selected from the primary database. The record in the instance database may be located in any suitable manner. For example, the record from the instance database may include an identifier, such as, for example, a key, associated with the record from the primary database. The primary application may then display data from the record from the instance database alongside the data for the record from the primary database. For example, the user interface may be web-based, and may use dynamic user-interface components that may allow sections of the displayed web-page to refreshed to display new data without requiring that the entirety of the web-page be reloaded. The dynamic user-interface component of the web-page may be provided with the data from the record from the instance database and may display this data without causing any change to the display of the data from the record from the primary database.

The user may use the user interface of the primary database system to select another instance of the secondary application, different from the previously selected instance of the secondary application. On receiving a selection of another instance of the secondary application from the user, the primary application may terminate the currently open session with the previously selected instance of the secondary application and may open a new session with the just-selected instance of the secondary application. The session may be opened using, for example, credentials that the user has previously entered into the primary application, or credentials that are attached to the user's session with the primary application. The primary application may request, from the instance of the secondary application, the record in the instance database for the instance of the secondary application that includes data associated with the record the user selected from the primary database. The primary application may then display data from the record from the instance database alongside the data for the record from the primary database, replacing the data was previously received from the instance database for the previously selected instance of the secondary application. For example, the user interface may be web-based, and may use dynamic user-interface components that may allow sections of the displayed web-page to refreshed to display new data without requiring that the entirety of the web-page be reloaded. The dynamic user-interface component of the web-page may be provided with the data from the record from the instance database, and may refresh the area in which the data from the record from the instance database for the previously selected instance of the secondary application was displayed to display the data from the record from the instance database for the just selected instance of the secondary application without causing any change to the display of the data from the record from the primary database.

Each time the user selects a different instance of the secondary application using the user interface, the primary application may terminate its current session with an instance of the secondary application and start a new session with the just-selected instance of the secondary application. The primary application may then request, from the just-selected instance of the secondary application, the record in the instance database for the just-selected instance of the secondary application that includes data associated with the record the user selected from the primary database. The primary application may then display this data on the user interface, replacing the data that was received from the previously-selected instance of the secondary application.

Selective synchronization may be used when syncing records between the primary database and the instance databases. This may allow for the specification of which records in the primary database are synced to the instance database. For example, a user interface may allow a user to specify criteria that records in the primary database must meet in order to be synced with the instance databases. The criteria may be related to any aspect of the data stored in the records in the primary database. For example, the records in the primary database may be contact records and may include aspects, or fields, for names, emails addresses, phone numbers, and organizations. The criteria for a contact record may be, for example, that a record includes the name of a specific organization, a phone number with a specific area code or three-digit prefix, an email address that belongs to a specific domain, a specific job title, or a specific classification assigned to the contact record. The criteria may have any suitable degree of specificity. For example, the criteria may require that the value of a specific field of the record be equal to, or greater than, or less than, a specific value, or match a specific expression or value statement.

When syncing records between the primary database and the instance database, an instance of the secondary application may only perform synchronization with records in the primary database that meet the criteria. Records that do not meet the criteria may not be synced with records in the instance database, even if they are linked to records in the instance database. Records that are in the primary database but do not have a linked record in the instance database may have a linked record created in the instance database if the record in the primary database meets the criteria. Otherwise, a record in the primary database without a linked record in the instance database that does not meet the criteria may not have a linked record created in the instance database. This may allow for selective synchronization of the records in the instance database with the records in the primary database, as the instance of the secondary application may only sync the records in the primary database that meet the criteria. The instance of the secondary application may push data from records in the instance database that meet the criteria to the linked records in the primary database, pull data from the linked records in the primary database to the records in the instance database, and pull date from non-linked records in the primary database to create a linked record in the instance database. Selective synchronization may reduce communication and computational costs, as the number of operations performed during a sync between the primary database and the instance databases may be reduced. For example, API calls may be used during synchronization of records, and selective synchronization may reduce the number of API calls needed to complete the synchronization. The number of records stored in the instance database may also be reduced compared to the number of stored in the primary database, as records in the primary database that do not meet the criteria may not have a linked record created in the instance database. Because each instance database may store its own record linked to a single record in the primary database, preventing the synchronization of a single record in the primary database may result in several few records being stored across the instance databases. For example, with four instance databases, preventing the synchronization of a single record in the primary database may reduce the number of records across the four instance databases by four.

Figure 1:
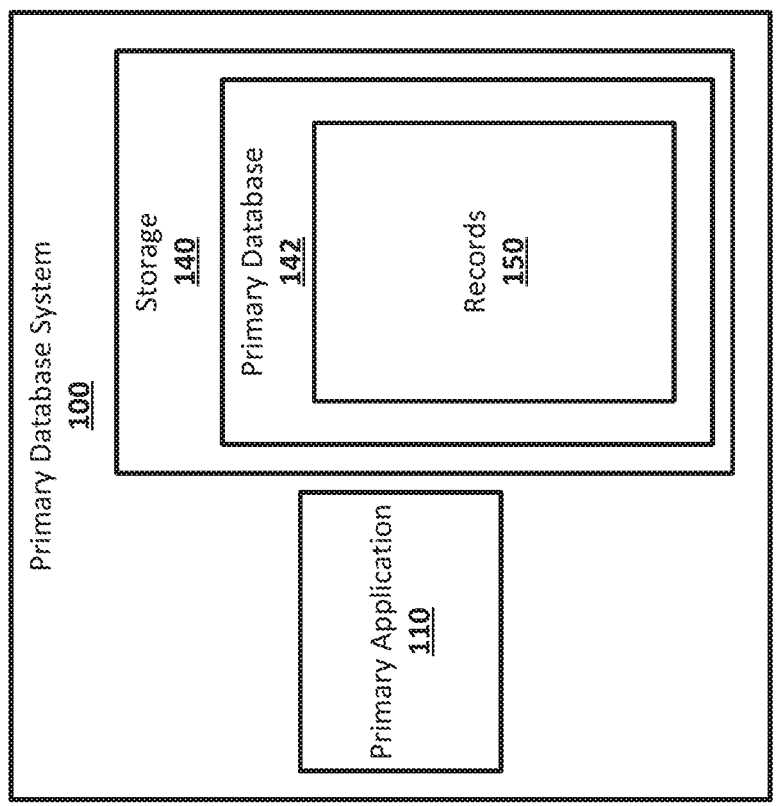
FIG. 1 shows an example system for access to data in multiple instances through a single record according to an implementation of the disclosed subject matter.

FIG. 1 shows an example system for access to data in multiple instances through a single record according to an implementation of the disclosed subject matter. A primary database system 100 may include any suitable computing devices, such as, for example, a computer 20 as described in FIG. 14 or component thereof. The primary database system 100 may be implemented on a laptop, a desktop, an individual server, a server cluster, a server farm, or a distributed server system, or can be implemented as a virtual computing device or system, or any suitable combination of physical and virtual systems. The primary database system 100 can be part of a computing system and network infrastructure or can be otherwise connected to the computing system and network infrastructure, including a larger server network which can include other server systems. The primary database system 100 may include, for example, any number of server systems which may be in communication with each other and may communicate in any suitable manner. For example, the server systems of the primary database system 100 may be connected through any suitable network, which may be any suitable combination of LANs and WANs, including any combination of private networks and the Internet. The primary database system 100 may include a primary application 110 and a storage 140. The storage 140 may include a primary database 142. Records 150 may be stored in the storage 140 as part of the primary database 142.

The primary application 110 may be any suitable combination of hardware and software of the primary database system 100 for interacting with and managing databases stored on the primary database system 100. The primary database system 100 may be, for example, a multi-tenant database system which may store databases for multiple tenants. The records 150 may include records for the databases for the multiple tenants of the primary database system 100. The primary application 110 may be able to retrieve records from the records 150 for a tenant based on a received query and may be able to manipulate records from the records 150. For example, the primary application 110 may be able to retrieve specified records of the records 150 to allow for display of data from the records on user interface.

The storage 140 may be any suitable combination of hardware and software for the storage of data, such as the records 150. For example, the storage 140 may include hard drives, solid state drives, random access memory, or other forms of data storage which may be persistent or non-persistent.

The records 150 may include records for the databases of the various tenants of the primary database system 100. Records in the records 150 may include a tenant identifier to identify the owner of the records. The tenant identifier assigned to a tenant may be used as part of the key for all of the records belonging to the tenant that may be stored in the database. The value of a tenant identifier may be represented as, for example, an alphanumeric string. A unique tenant identifier may be assigned to each of the tenants of the primary database system 100. Multi-tenancy may allow various tenants, which may be, for example, users, groups of users, or organizations, to access their own records in the primary database system 100 through software tools or instances on the primary database system 100 that may be shared among the various tenants. The database for each tenant, including records stored in the records 150, may be, for example, a relational database, hierarchical database, or any other suitable database type. The records 150 may be stored in the storage 140 of the primary database system 100 in any suitable structure, including, for example, a Log-Structured Merge (LSM) tree. The records may be stored immutable, so that updates to a record after the record is created result in the creation of a new version of the record without making any changes to the stored previous version of the record.

A record from the records 150 stored in the primary database system 100 may include a key. The key may be an identifier for the record, for example, a primary key, and may be in any suitable form, such as, for example, an alphanumeric sequence. Portions of the key may provide information about the record. For example, a portion of the key be the tenant identifier for the tenant to whom the record belongs. Other portions of the key may identify, for example, a table number and identification of a row, for example, when the value of record is the contents of a row.

A record of the records 150 may include values. The values in a record may be, for example, the contents of columns in a row of a table of a relational database, stored as a tuple with one value per column. The values may be related to various aspects, for example, fields, of the record, which may correspond to the labels of columns of a table of the relational database to which the record belongs. For example, a record of the records 150 in the primary database 142 may be a contact record that may identify an individual person as a contact, and aspects of the record may include, for example, a title, a first name, a last name, phone numbers, email addresses, physical addresses, job titles, organization names, and any other aspect that may describe a person, their role within an organization, and ways in which the person may be contacted.

FIG. 2 shows an example arrangement for access to data in multiple instances through a single record according to an implementation of the disclosed subject matter. A secondary database system 200 may include any suitable computing devices, such as, for example, a computer 20 as described in FIG. 14 or component thereof. The secondary database system 200 may be implemented on a laptop, a desktop, an individual server, a server cluster, a server farm, or a distributed server system, or can be implemented as a virtual computing device or system, or any suitable combination of physical and virtual systems. The secondary database system 200 can be part of a computing system and network infrastructure or can be otherwise connected to the computing system and network infrastructure, including a larger server network which can include other server systems. The secondary database system 200 may include, for example, any number of server systems which may be in communication with each other and may communicate in any suitable manner. For example, the server systems of the secondary database system 200 may be connected through any suitable network, which may be any suitable combination of LANs and WANs, including any combination of private networks and the Internet. The secondary database system 200 may include secondary application instances 210, 220, and 230, and a storage 240. The storage 240 may include instance databases 242, 252, and 262. Records 244 may be stored in the storage 240 as part of the instance database 242. Records 254 may be stored in the storage 240 as part of the instance database 252. Records 256 may be stored in the storage 240 as part of the instance database 254.

The secondary application instances 210, 220, and 230 may be instances of a secondary application that may be any suitable combination of hardware and software of the secondary database system 200 for interacting with and managing databases stored on the secondary database system 200. The secondary database system 200 may, for example, be used by different divisions of an entity, as different business units of an organization. Each division may use its own instance of the secondary application when interacting with the secondary database system. The records 244, 254, and 264 may include records for the databases for the divisions of the secondary database system 200, stored in respective instance databases 242, 252, and 262. Each instance of the secondary application may be able to retrieve records from one of the instance databases in the storage 240. The secondary application instance 210 may be able to retrieve records from the records 244 in the instance database 242. The secondary application instance 220 may be able to retrieve records from the records 254 in the instance database 252. The secondary application instance 230 may be able to retrieve records from the records 264 in the instance database 262.

The storage 240 may be any suitable combination of hardware and software for the storage of data, such as the records 244, 254, and 264. For example, the storage 140 may include hard drives, solid state drives, random access memory, or other forms of data storage which may be persistent or non-persistent.

The records 244, 254, and 264 may include records for the instance databases 242, 254, and 264 of the secondary database system 200. A record in any of the records 244, 254, and 264 may include values. The values in a record may be, for example, the contents of columns in a row of a table of a relational database, stored as a tuple with one value per column. The values may be related to various aspects, for example, fields, of the record, which may correspond to the labels of columns of a table of the relational database to which the record belongs.

The records of the records 244, 254, and 264 may be associated, or linked, to records in the records 150 of the primary database 142. The association, or linkage, may be one-to-many between a record of the records 150 and the records of the records 244, 254, and 264. The association or linkage may be established in any suitable manner. For example, a record of the records 244, 254, and 264 may store the key of the record from the records 150 to which the record of the records 244, 254, and 264 is linked. The data in a record of the records 244, 254, and 264 may be related to the data in a record of the records 150 to which the record of the records 244, 254, and 264 is linked. For example, if a record of the records 150 is a contact record, a linked record from the records 244, 254, or 264 may be a prospect record. A prospect record may include data that may supplement the contact record. Aspects of a prospect record may include, for example, a score for the contact identified by the linked contact record, a grade for the linked contact identified by the contact record, and date of the last activity of the contact identified by the linked contact record. The score may be, for example, a numerical evaluation of likely the contact in the linked record is to purchase goods or services from a business unit that uses the instance of the secondary application for the instance database in which the prospect record is stored. A prospect record may include aspects that may already be included in the contact record, such as, for example, a first name, a last name, phone numbers, email addresses, physical addresses, job titles, organization names, and any other aspect that may describe a person, their role within an organization, and ways in which the person may be contacted.

Figure 3:
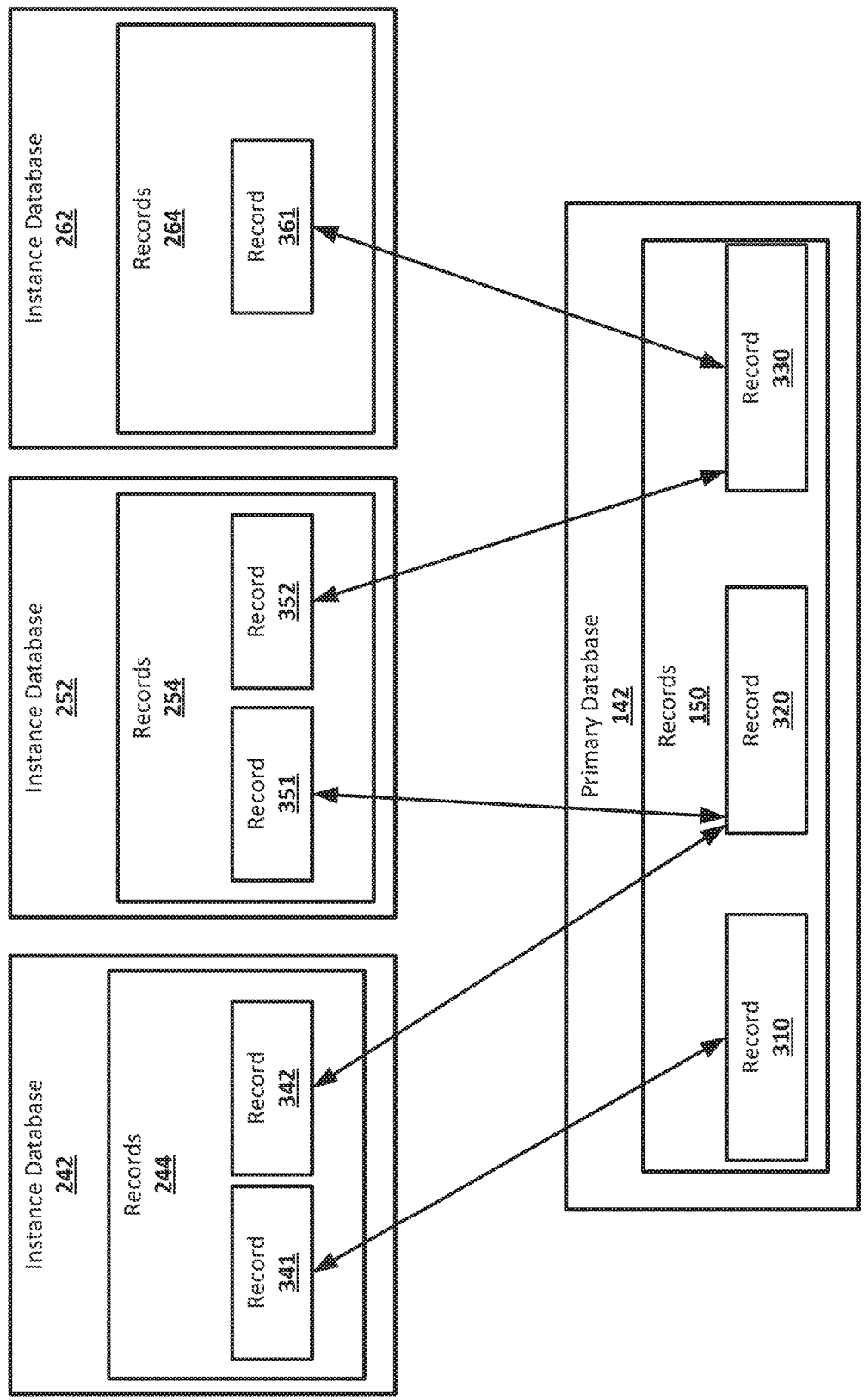
FIG. 3 shows an example arrangement for access to data in multiple instances through a single record according to an implementation of the disclosed subject matter.

FIG. 3 shows an example arrangement for access to data in multiple instances through a single record according to an implementation of the disclosed subject matter. Associations or linkages between records in the records 150 of the primary database 142 and records of the records 244, 254, and 264 in the instance databases 242, 252, and 262 may be one-to-many. A record of the records 150 may only be associated with one record in each instance database of the instance databases 242, 252, and 262, buy may be associated with records from any number of the instance databases 242, 252, and 262. For example, a record 310 of the records 150 in the primary database 142 may be linked to a record 341 of the records 244 in the instance database 242. A record 320 of the records 150 in the primary database 142 may be linked to a record 342 of the records 244 in the instance database 242 and to a record 351 of the records 254 in the instance database 254. A record 330 of the records 150 in the primary database 142 may be linked to a record 352 of the records 254 in the instance database 252 and to a record 361 of the records 264 in the instance database 264.

Figure 4:
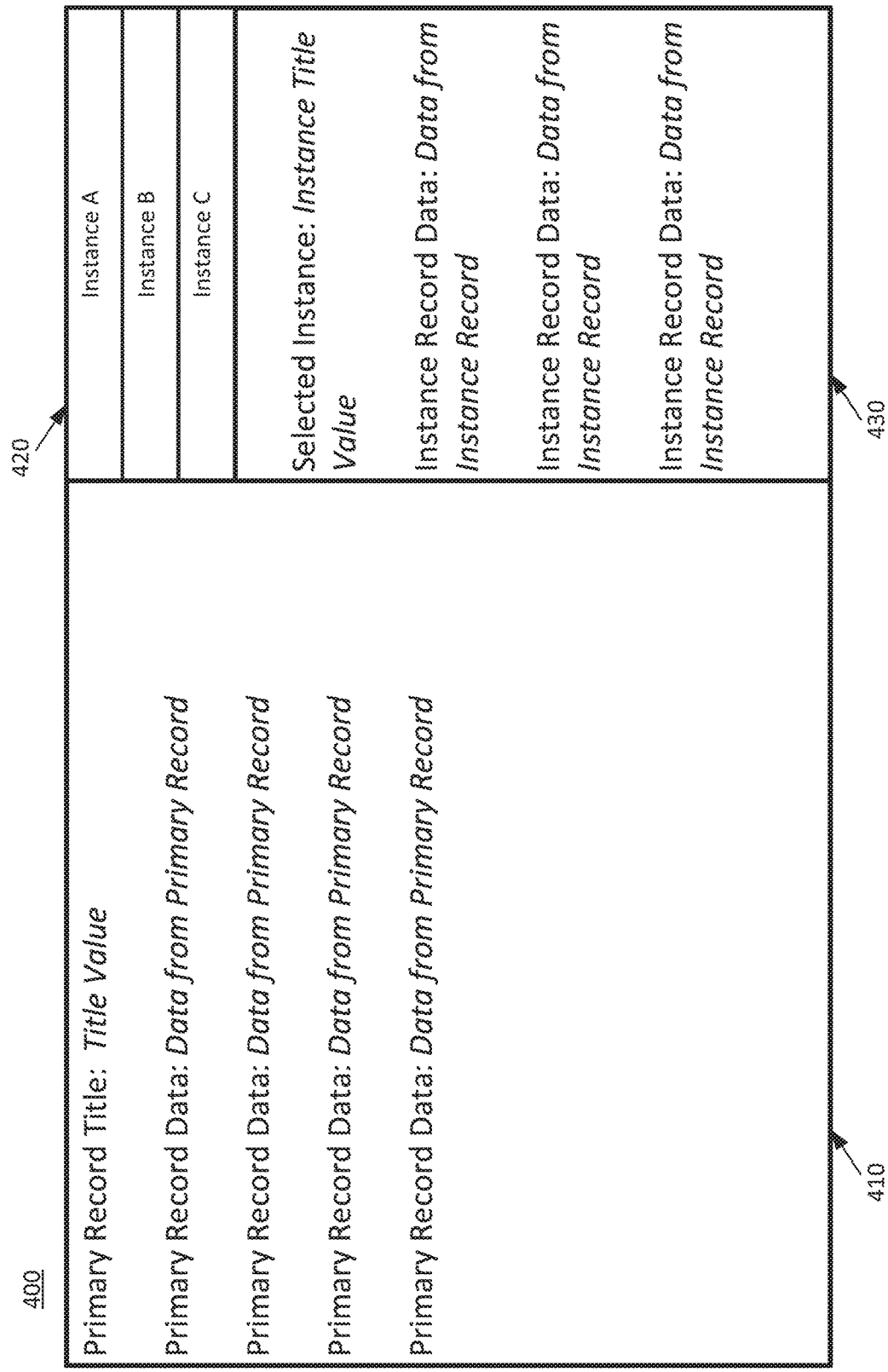
FIG. 4 shows an example user interface for access to data in multiple instances through a single record according to an implementation of the disclosed subject matter.

FIG. 4 shows an example user interface for access to data in multiple instances through a single record according to an implementation of the disclosed subject matter. A user interface 400 may allow a user to interact with the primary application 110. The user interface 400 may be, for example, a web-based interface accessed through any suitable web browser and hosted on the primary database system 100 or on a separate server system, or may be, for example, an application-based interface which may be accessed using, for example, a client application that may connect to the primary application 110.

The user interface may include a primary record display area 410, an instance selector 420, and a secondary record display area 430. The primary record display area 410 may display different aspects of a record, such as the record 310, from the records 150 on the primary database system 100. The displayed aspects may be any suitable aspects from the record, and may include, for example, a title of the record and various data aspects, or fields, from the record. A user may select a record from the records 150 of the primary database 142 to display in the primary record display area 410 in any suitable manner. For example, the user interface 400, or other user interfaces of the primary application 110, may include features that allow for the searching or browsing of the records of the records 150 and for the selection of a record to display in the primary record display area 410.

The instance selector 410 may be a control of the user interface 400 that may allow a user to select an instance of the secondary application to connect to, and from whose associated instance database a record that is linked to the record whose data is displayed in the primary record display area 410 may be retrieved. The instance selector 410 may display all of the instances of the secondary application that may be running on the secondary database system 200 or may display only those instances of the secondary application that are associated with an instance database that includes a record linked to the record from the primary database 142 displayed in the primary record display area 400.

The secondary record display area 430 may display different aspects of a record, such as the record 341, from any of the records 244, 254, and 264 in any of the instance database 242, 252, and 262 on the secondary database system 200. The secondary record display area 430 may also display an identification, such as a title, of the selected instance of the secondary application. The title of a selected instance of a secondary application may be, for example, the title of a division, such as a business unit, that uses the selected instance of the secondary application. The displayed aspects of the record may be any suitable aspects from the record, and may include, for example, various data aspects, or fields, from the record.

Figure 5A:
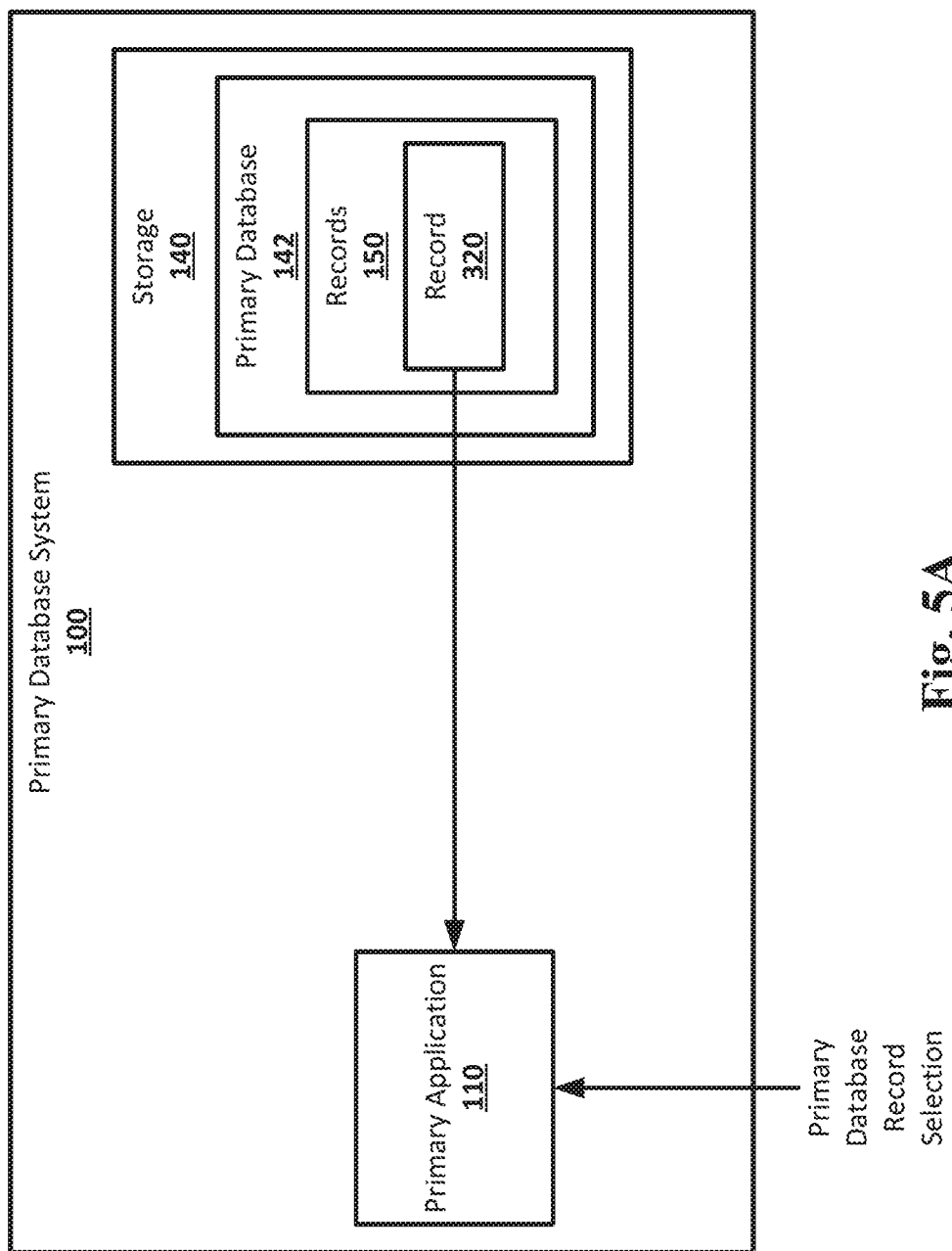
FIG. 5A shows an example arrangement for access to data in multiple instances through a single record according to an implementation of the disclosed subject matter.

FIG. 5A shows an example arrangement for access to data in multiple instances through a single record according to an implementation of the disclosed subject matter. A selection of a record from among the records 150 in the primary database 142 may be received by the primary application 110. The selection may be input, for example, by a user through the user interface 400 or another user interface of the primary application 110. The primary application 110 may receive the selected record from the primary database 142. For example, the primary application 110 may receive a selection of the record 320 and may then retrieve the record 320 from the primary database 142. Aspects of the record 320 may be displayed on the user interface 400 in the primary record display area 410 by the primary application 110. For example, the record 320 may be a contact record, and the user interface 400 may be used to display, the full name of the contact, which may be, for example, an individual person, identified by the contact record as the record title, the contact's first name, the contact's last name, email addresses for the contact, phone numbers for the contact, a job title for the contact, and an organization for the contact.

Figure 5B:
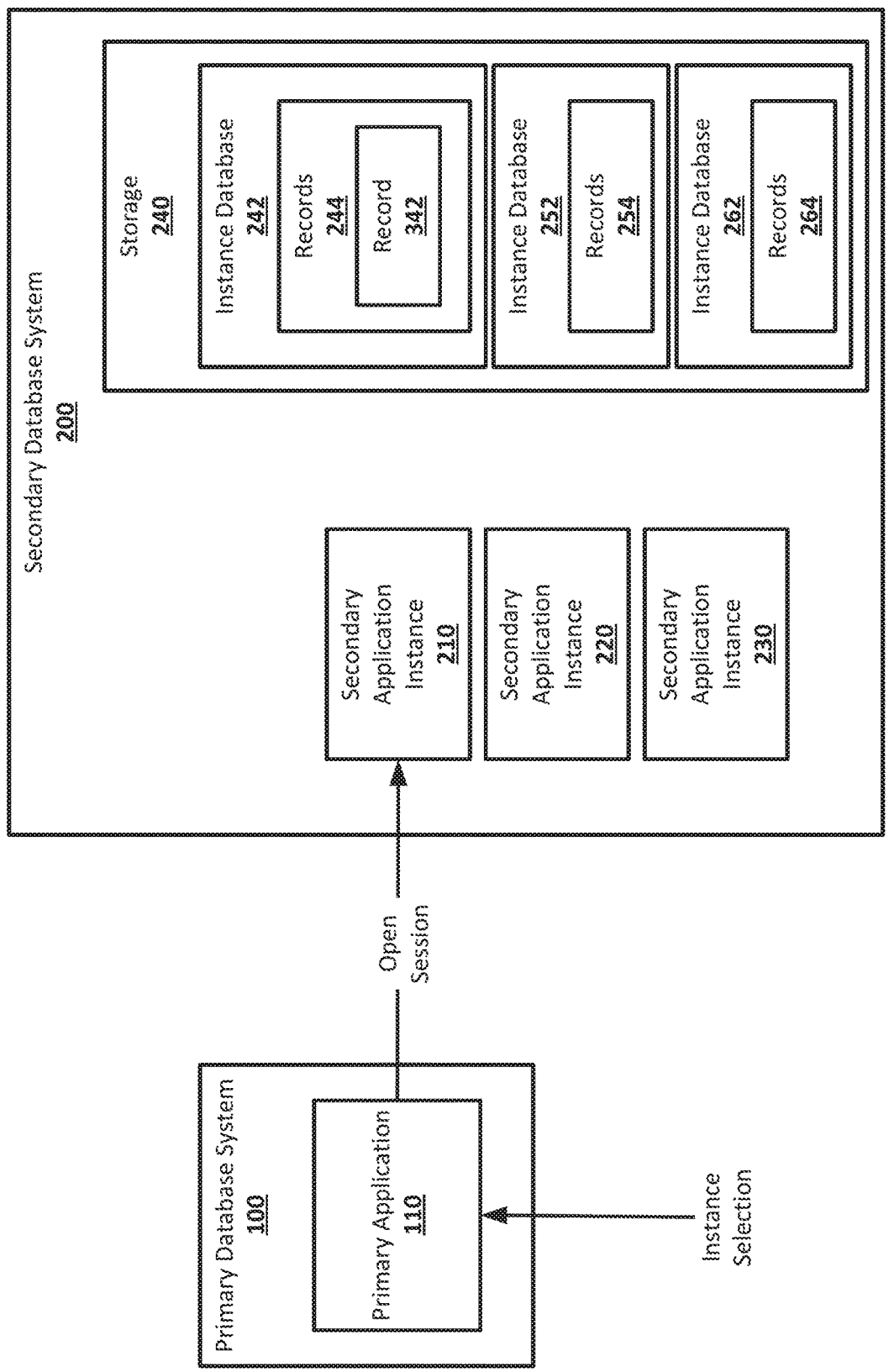
FIG. 5B shows an example arrangement suitable for access to data in multiple instances through a single record according to an implementation of the disclosed subject matter.

FIG. 5B shows an example arrangement for access to data in multiple instances through a single record according to an implementation of the disclosed subject matter. A selection of an instance of the secondary application may be received by the primary application 110. The selection may be input, for example, by a user through the user interface 400 using the instance selector 420. The primary application 110 may open a session with a selected instance of the secondary application on the secondary database system 200. For example, the instance selector 420 may be used to select the secondary application instance 210. The primary application 110 may open a session with the secondary application instance 210. The session may be opened in any suitable manner, using any suitable type of communication and any suitable communications protocols. The primary application 110 may, for example, use credentials associated with a user account that may be used by the user to access the primary application 110 and the primary database 142 to open a session with the secondary application instance 210. The credentials may be, for example, a token, such as a JSON Web Token, provided by the primary application 110 to a computing device used by the user to access the primary application 110 based on the user providing credentials for a user account that is authorized to access the primary application 110.

In some implementations, one of the instances of the secondary application may be selected by default when the user selects a record from the primary database 142. The primary application 110 may automatically open a session with the instance of the secondary application selected by default, without user input.

Figure 5C:
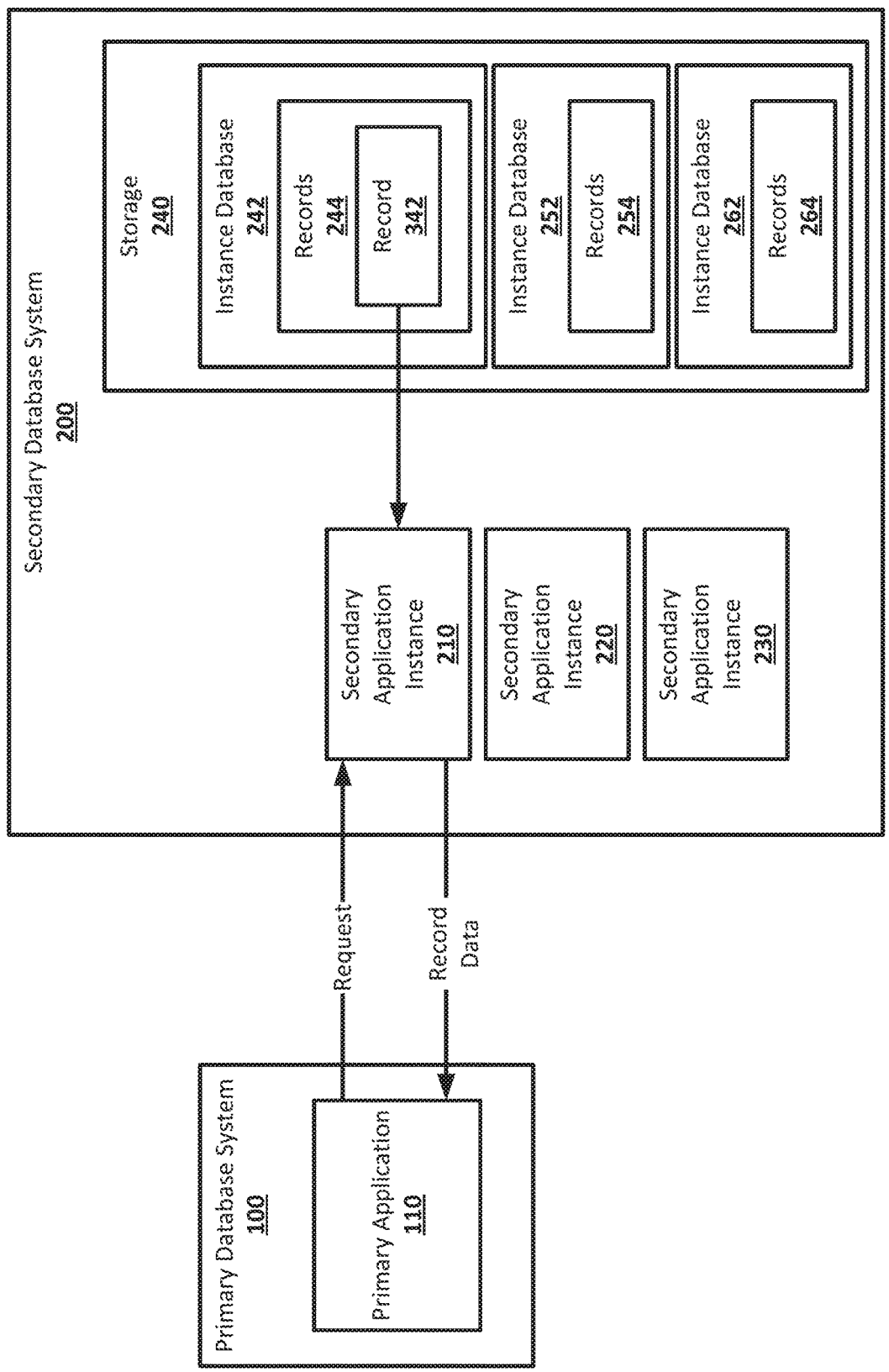
FIG. 5C shows an example arrangement suitable for access to data in multiple instances through a single record according to an implementation of the disclosed subject matter.

FIG. 5C shows an example arrangement for access to data in multiple instances through a single record according to an implementation of the disclosed subject matter. The primary application 110 may receive record data from a record in an instance database for the selected instance of the secondary application on the secondary database system 200. For example, the primary application 110 may use the open session with the secondary application instance 210 to request a record from the instance database 242 that is linked to the record 320 from the primary database 142. The secondary application instance 210 may locate the linked record, which may be the linked record 342, from among the records 244 in the instance database 242. The record 342 may be located in any suitable manner. For example, the request from the primary application 110 may include the key of the record 320. The secondary application instance 210 may search the instance database 242 for a record that includes the key of the record 320, which may be the record 342. The secondary application instance 210 may send record data from the record 342 to the primary application 110 to be displayed in the secondary record display area 430 of the user interface 400. The record data may include the entirety of the record 342, or may only include aspects of the record 342 that may be displayed in the secondary record display area 430 of the user interface 400. For example, the record 342 may be a prospect record that may include a score for the contact identified by the record 320 as assigned by a business unit that may use the secondary application instance 210. The score may be displayed in the secondary record display area 430 of the user interface 400.

FIG. 5D shows an example arrangement for access to data in multiple instances through a single record according to an implementation of the disclosed subject matter. A selection of an instance of the secondary application may be received by the primary application 110. The selection may be input, for example, by a user through the user interface 400 using the instance selector 420. The primary application 110 may close a currently open session with an instance of the secondary application on the secondary database system 200 that is different from the selected instance of the secondary application. For example, the instance selector 420 may be used to select the secondary application instance 220 while a session with the secondary application 210 is open. The primary application 110 may close the session with the secondary application instance 210. The session may be closed in any suitable manner, using any suitable type of communication and any suitable communications protocols.

Figure 5E:
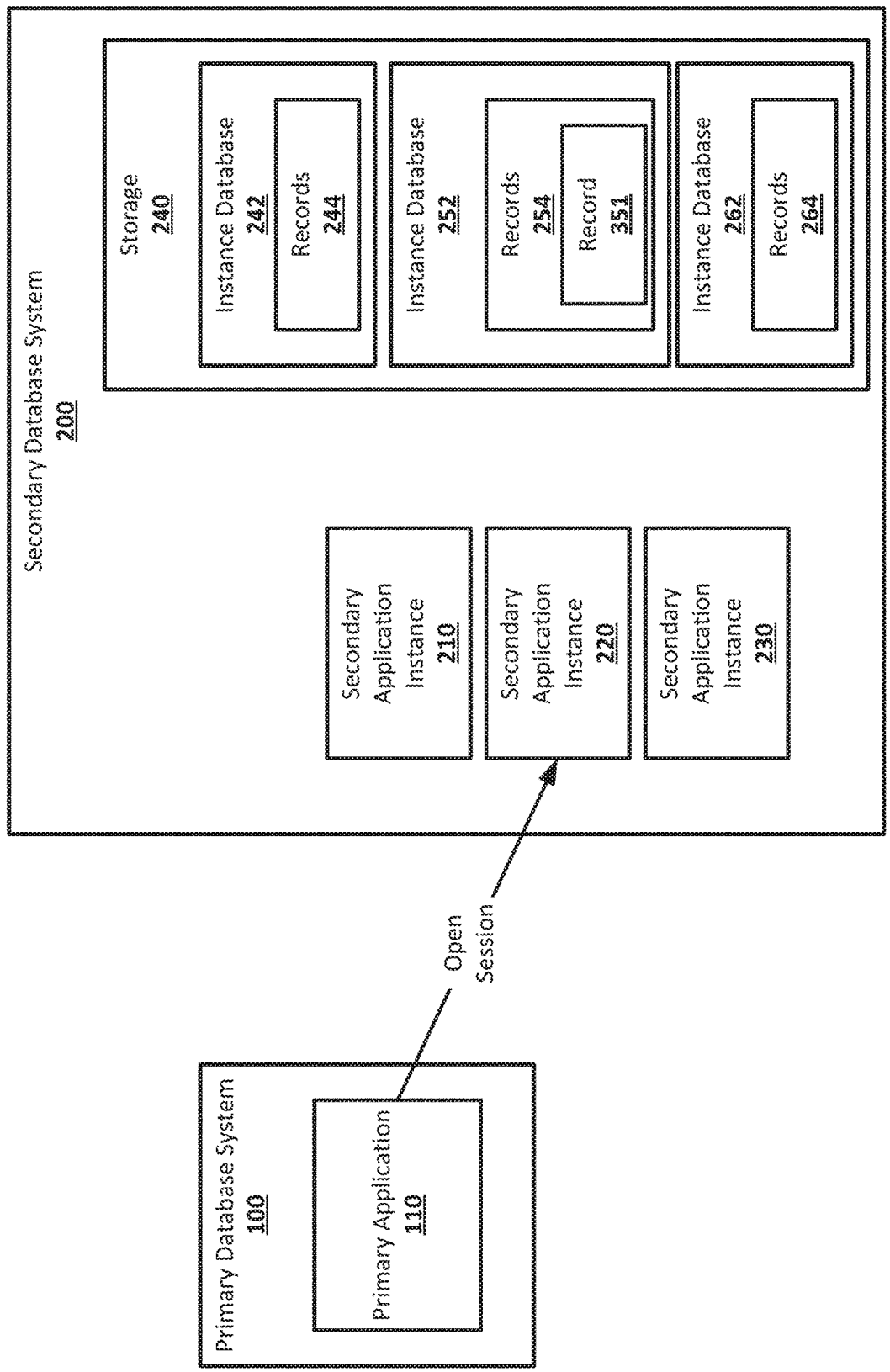
FIG. 5E shows an example arrangement suitable for access to data in multiple instances through a single record according to an implementation of the disclosed subject matter.

FIG. 5E shows an example arrangement for access to data in multiple instances through a single record according to an implementation of the disclosed subject matter. After closing a session with an instance of the secondary application due to receiving a selection of a different instance of the secondary application, the primary application 110 may open a session with the selected instance of the secondary application. For example, the instance selector 420 may have been used to select the secondary application instance 220, resulting in the closure of the session between the primary application 110 and the secondary application instance 210. The primary application 110 may open a session with the secondary application instance 220. The session may be opened in any suitable manner, using any suitable type of communication and any suitable communications protocols. The primary application 110 may, for example, use credentials associated with a user account that may be used by the user to access the primary application 110 and the primary database 142 to open a session with the secondary application instance 210. The credentials may be, for example, a token, such as a JSON Web Token, provided by the primary application 110 to a computing device used by the user to access the primary application 110 based on the user providing credentials for a user account that is authorized to access the primary application 110. The credentials used to open the session with the secondary application instance 220 may be the same as the credentials used to open the session with the primary application 210 or may be different.

Figure 5F:
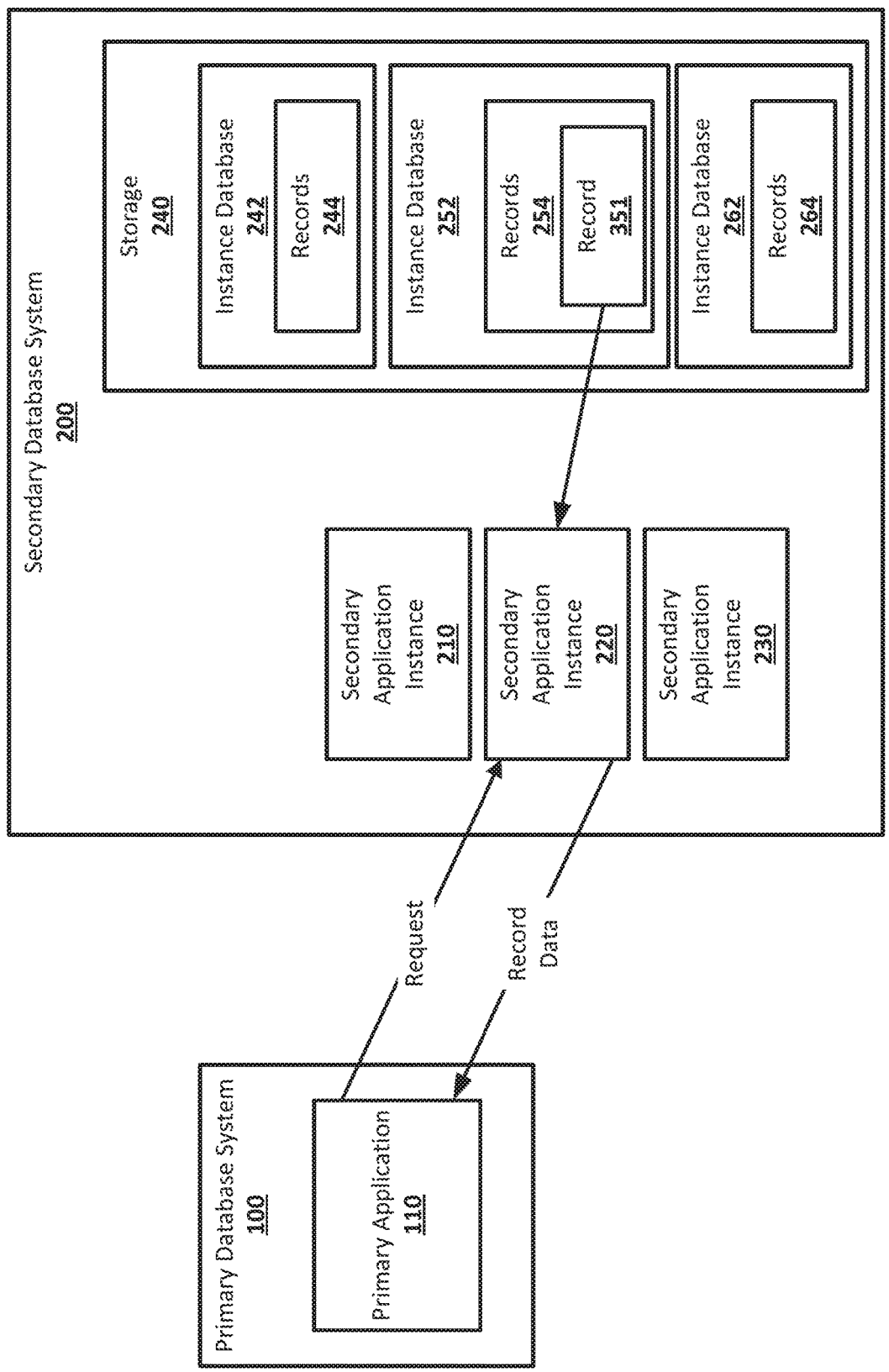
FIG. 5F shows an example arrangement suitable for access to data in multiple instances through a single record according to an implementation of the disclosed subject matter.

FIG. 5F shows an example arrangement for access to data in multiple instances through a single record according to an implementation of the disclosed subject matter. The primary application 110 may receive record data from a record in an instance database for the selected instance of the secondary application on the secondary database system 200. For example, the primary application 110 may use the open session with the secondary application instance 220 to request a record from the instance database 252 that is linked to the record 320 from the primary database 142. The secondary application instance 210 may locate the linked record, which may be the linked record 351, from among the records 254 in the instance database 252. The record 351 may be located in any suitable manner. For example, the request from the primary application 110 may include the key of the record 320. The secondary application instance 220 may search the instance database 252 for a record that includes the key of the record 320, which may be the record 351. The secondary application instance 220 may send record data from the record 351 to the primary application 110 to be displayed in the secondary record display area 430 of the user interface 400 in place of record data from the record 342. The record data may include the entirety of the record 351, or may only include aspects of the record 351 that may be displayed in the secondary record display area 430 of the user interface 400. For example, the record 251 may be a prospect record that may include a score for the contact identified by the record 320 as assigned by a business unit that may use the secondary application instance 220. The score may be displayed in the secondary record display area 430 of the user interface 400 and may be different from the previously displayed score from the record 342.

Figure 6A:
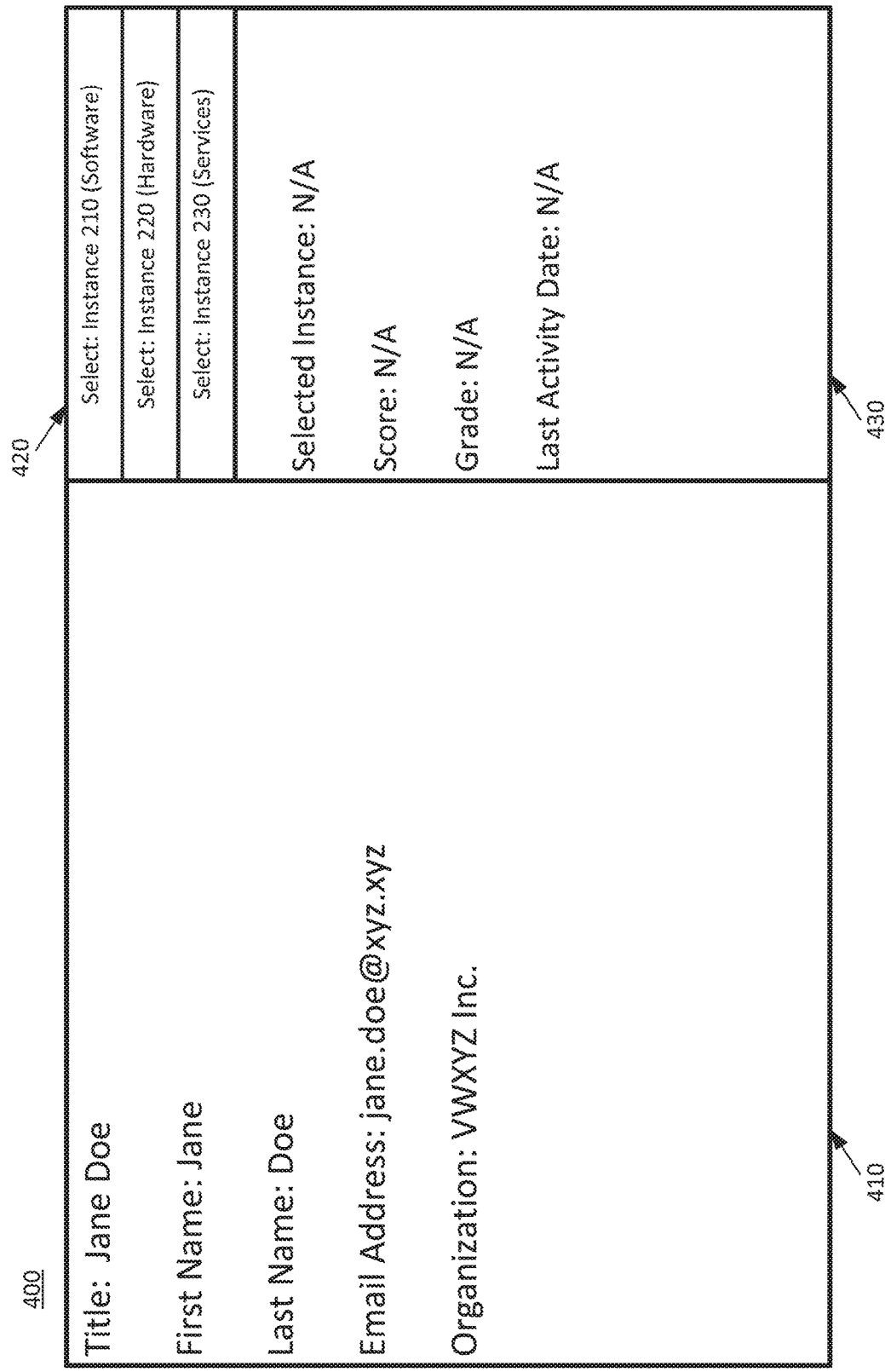
FIG. 6A shows an example user interface for access to data in multiple instances through a single record according to an implementation of the disclosed subject matter.

FIG. 6A shows an example user interface for access to data in multiple instances through a single record according to an implementation of the disclosed subject matter. After a record from the primary database 142 has been selected, but before an instance of the secondary application has been selected, the user interface 400 may display aspects of the record from the primary database 142. For example, the record 320 may be selected from the primary database and may be a contact record. The primary record display area 410 may display the title of the record 320, which may be the full name of the contact identified by the record 320, the first name of the contract, the last name of the contact, an email address for the contact, and an organization for the contact.

The instance selector 420 may display the instances of the secondary application that are available for selection. For example, the instance selector 420 may display the secondary application instance 210, which may be used by software business unit of an organization that owns the records 150 in the primary database 142, the secondary application instance 220, which may be used by a hardware business unit of that organization, and the secondary application instance 230, which may be used by a services business of that organization. The user may be able to use the instance selector 420 to select one of the instances of the secondary application, and associated business unit, for which to display data in the secondary record display area 430.

Figure 6B:
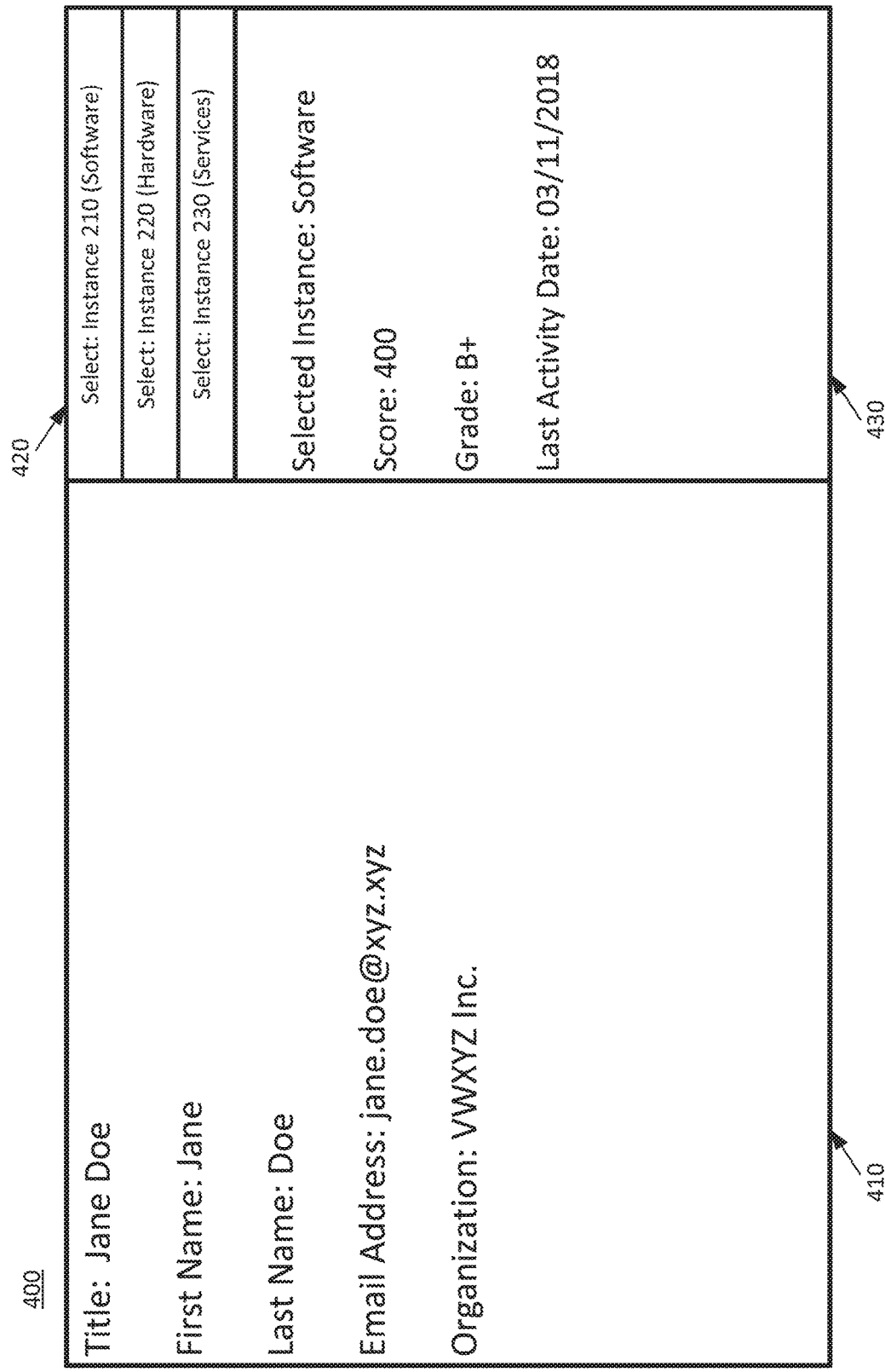
FIG. 6B shows an example user interface for access to data in multiple instances through a single record according to an implementation of the disclosed subject matter.

FIG. 6B shows an example user interface for access to data in multiple instances through a single record according to an implementation of the disclosed subject matter. After an instance of the secondary application has been selected, aspects of the record that is in the associated instance database and is linked to the record selected from the primary database 142 may be displayed in the secondary record display area 430. For example, the user may have used the instance selector 420 to select the secondary application instance 210, for the software business unit. The primary application 110 may have opened a session with the secondary application instance 210, which may have retrieved the record 342, which may be linked to the record 320, from the instance database 242. The secondary record display area 430 may display an identifier for the selected instance of the secondary application. For example, the title "Software" may be displayed to indicate that the selected instance of the secondary application, the secondary application instance 310, may be associated with the software business unit of the organization. Aspects of the record 342 may be displayed in the secondary record display area 430. For example, a score and a grade assigned by or on behalf of the software business unit of the organization to the contact identified by the record 320 may be displayed in the secondary record display area 430, providing additional information to a user related to the contact whose information is displayed in the primary record display area 410.

Figure 6C:
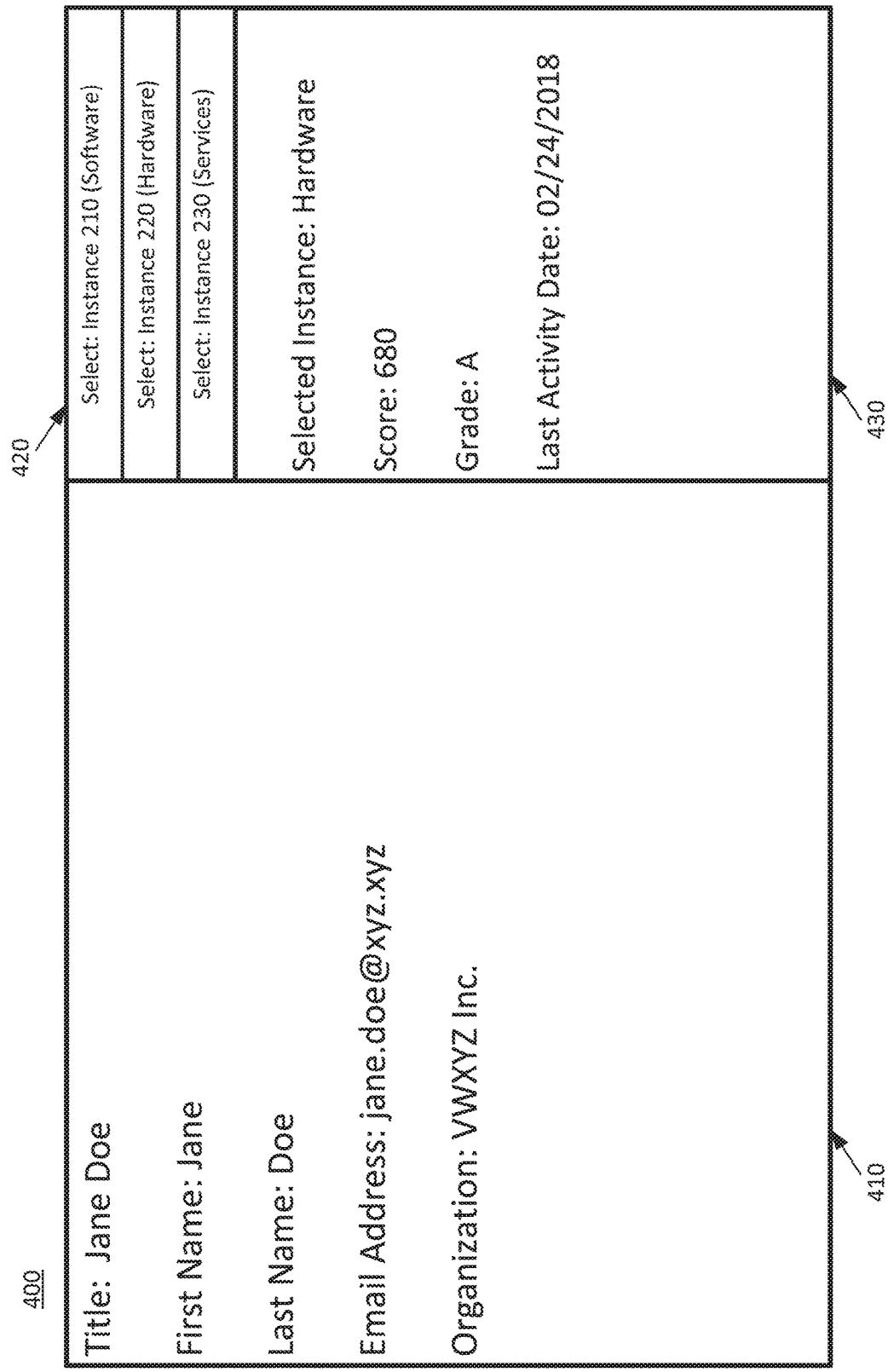
FIG. 6C shows an example user interface for access to data in multiple instances through a single record according to an implementation of the disclosed subject matter.

FIG. 6C shows an example user interface for access to data in multiple instances through a single record according to an implementation of the disclosed subject matter. After another instance of the secondary application has been selected, aspects of the record that is in the associated instance database and is linked to the record selected from the primary database 142 may be displayed in the secondary record display area 430 in place of the previously displayed aspects of the record for the previously selected instance of the secondary application. For example, the user may have used the instance selector 420 to select the secondary application instance 220, for the hardware business unit. The primary application 110 may have closed the session with the secondary application instance 210 and may have opened a session with the secondary application instance 220. The secondary application 220 which may have retrieved the record 351, which may be linked to the record 320, from the instance database 252. The secondary record display area 430 may display an identifier for the selected instance of the secondary application. For example, the title "Hardware" may be displayed to indicate that the selected instance of the secondary application, the secondary application instance 320, may be associated with the hardware business unit of the organization. Aspects of the record 351 may be displayed in the secondary record display area 430 in place of the aspects of the record 342. For example, a score and a grade assigned by or on behalf of the hardware business unit of the organization to the contact identified by the record 320 may be displayed in the secondary record display area 430 in place of the score or grade from the record 342, providing additional information to a user related to the contact whose information is displayed in the primary record display area 410.

Figure 7:
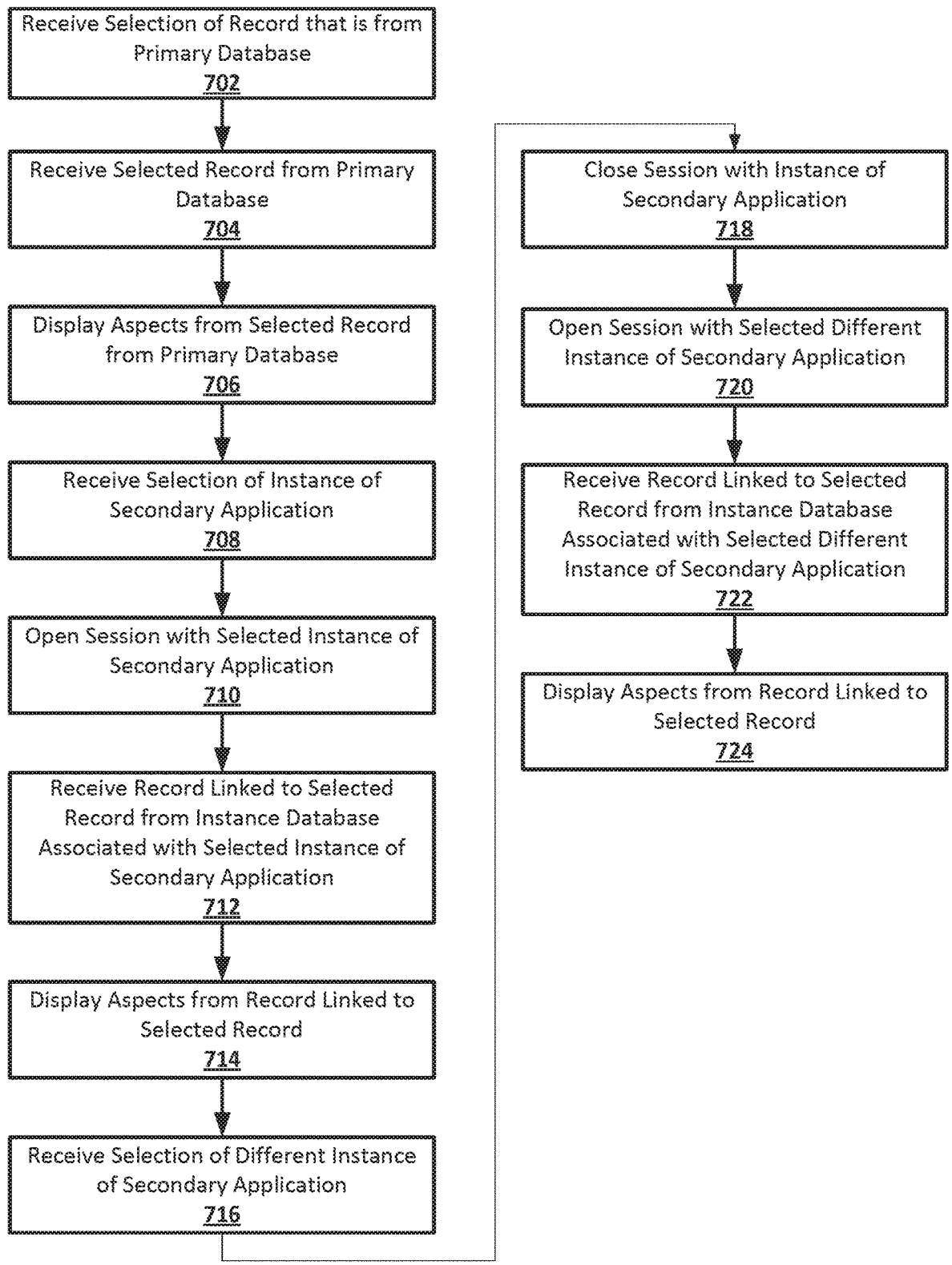
FIG. 7 shows an example procedure suitable for access to data in multiple instances through a single record according to an implementation of the disclosed subject matter.

FIG. 7 shows an example procedure suitable for access to data in multiple instances through a single record according to an implementation of the disclosed subject matter. At 702, a selection of a record that is in a primary database may be received. For example, the primary application 110 may receive a selection of a record of the records 150 in the primary database 142 from a user. The user may use, for example, the user interface 400 or another user interface of the primary application 110 to select the record. The user may access the primary application 110 on the primary database system 100 using, for example, credentials for the primary database system 100.

At 704, the selected record may be received from the primary database. For example, the primary application 110 may receive the record selected by the user from primary database 142, for example, the record 320. The primary application 110 may receive the entirety of the selected record or may only receive aspects of the selected record.

At 706, aspects from the selected record from the primary database may be displayed. For example, the primary application 110, after receiving the selected record, which may be the record 320, may display aspects of the record in the primary record display area 410 of the user interface 400. The record 320 may be, for example, a contact record identifying an individual, and the aspects of the record that may be displayed may include a title for the record, for example, the full name of the contact, the first name of the contact, the last name of the contact, email addresses for the contact, phone numbers for the contact, physical addresses for the contact, a job title for the contact, and an organization.

At 708, a selection of an instance of a secondary application may be received. For example, the primary application 110 may receive a selection of an instance of a secondary application, such as any of the secondary application instances 210, 220, and 230, running on a secondary database system 200 through the instance selector 420 of the user interface 400.

At 710, a session may be opened with the selected instance of the secondary application. For example, the primary application 110 may open a session with the selected instance of the secondary application, which may be, for example, the secondary application instance 210. The primary application 110 may communicate with the secondary database system 200 and secondary application instance 210 using any suitable wired or wireless communications and any suitable communications protocols. The primary application 110 may open the session with the secondary application instance 210 in any suitable manner. For example, the primary application 110 may use credentials, such as a token that may be generated when a user uses credentials to access the primary application 110, to open the session with the secondary application instance 210.

At 712, a record linked to the selected record may be received from an instance database that is associated with the selected instance of the secondary application. For example, the instance database 242 may be associated with the selected instance of the secondary application, secondary application instance 210. The record 342 of the records 244 in the instance database 242 may be linked to the record 320 that was selected from the primary database 142. The secondary application instance 210 may send the record 342 in its entirety, or aspects thereof, to the primary application 110.

At 714, aspects from the record linked to the selected record may be displayed. For example, the primary application 110, after receiving the record linked to the selected record, which may be the record 342, may display aspects of the record in the secondary record display area 420 of the user interface 400. The record 342 may be, for example, a prospect record that includes additional information about the contact identified by the record 320, which may be a contact record. Data in the record 342 may be from the division, for example, business unit, that uses the secondary application instance 210. Aspects of the record 342 that may be displayed in the secondary record display area 430 may include, for example, a score and a grade assigned by or on behalf of the software business unit of the organization to the contact identified by the record 320. The aspects displayed from the record 342 may provide additional information related to the contact whose information is displayed in the primary record display area 410. An identification of the division that uses the secondary application instance 210 may also be displayed in the secondary record display area 430.

At 716, a selection of a different instance of the secondary application may be received. For example, the primary application 110 may receive a selection of an instance of a secondary application, such as any of the secondary application instances 210, 220, and 230, running on a secondary database system 200 through the instance selector 420 of the user interface 400. The selection may be of a different instance of the secondary application than the one for which aspects of a record are displayed in the secondary record display area 430. For example, if aspects of the record 342 from the instance database 242 associated with the secondary application instance 210 are displayed in the secondary record display area 430, the selection received through the instance selector 420 may be of the secondary application instance 220 or the secondary application instance 230.

At 718, the session with the instance of the secondary application may be closed. For example, the primary application 110 may close the session with the instance of the secondary application for which there is an open session. For example, if the primary application 110 has an open session with the secondary application 210, the primary application 110 may close this session when the selection of a different instance of the secondary application is received.

At 720, a session may be opened with the selected different instance of the secondary application. For example, the primary application 110 may open a session with the selected different instance of the secondary application, which may be, for example, the secondary application instance 220, different from the previously selected instance of the secondary application, secondary application instance 210. The primary application 110 may communicate with the secondary database system 200 and secondary application instance 220 using any suitable wired or wireless communications and any suitable communications protocols. The primary application 110 may open the session with the secondary application instance 220 in any suitable manner. For example, the primary application 110 may use credentials, such as a token that may be generated when a user uses credentials to access the primary application 110, to open the session with the secondary application instance 220.

At 722, a record linked to the selected record may be received from an instance database that is associated with the selected instance of the secondary application. For example, the instance database 252 may be associated with the selected instance of the secondary application, secondary application instance 220. The record 351 of the records 254 in the instance database 252 may be linked to the record 320 that was selected from the primary database 142. The secondary application instance 220 may send the record 351 in its entirety, or aspects thereof, to the primary application 110.

At 724, aspects from the record linked to the selected record may be displayed. For example, the primary application 110, after receiving the record linked to the selected record, which may be the record 351, may display aspects of the record in the secondary record display area 420 of the user interface 400. The record 351 may be, for example, a prospect record that includes additional information about the contact identified by the record 320, which may be a contact record. Data in the record 351 may be from the division, for example, business unit, that uses the secondary application instance 220, which may be different from the division that used the secondary application instance 210. Aspects of the record 351 that may be displayed in the secondary record display area 430 may include, for example, a score and a grade assigned by or on behalf of the software business unit of the organization to the contact identified by the record 320. The aspects displayed from the record 351 may provide additional information related to the contact whose information is displayed in the primary record display area 410. An identification of the division that uses the secondary application instance 220 may also be displayed in the secondary record display area 430.

Figure 8:
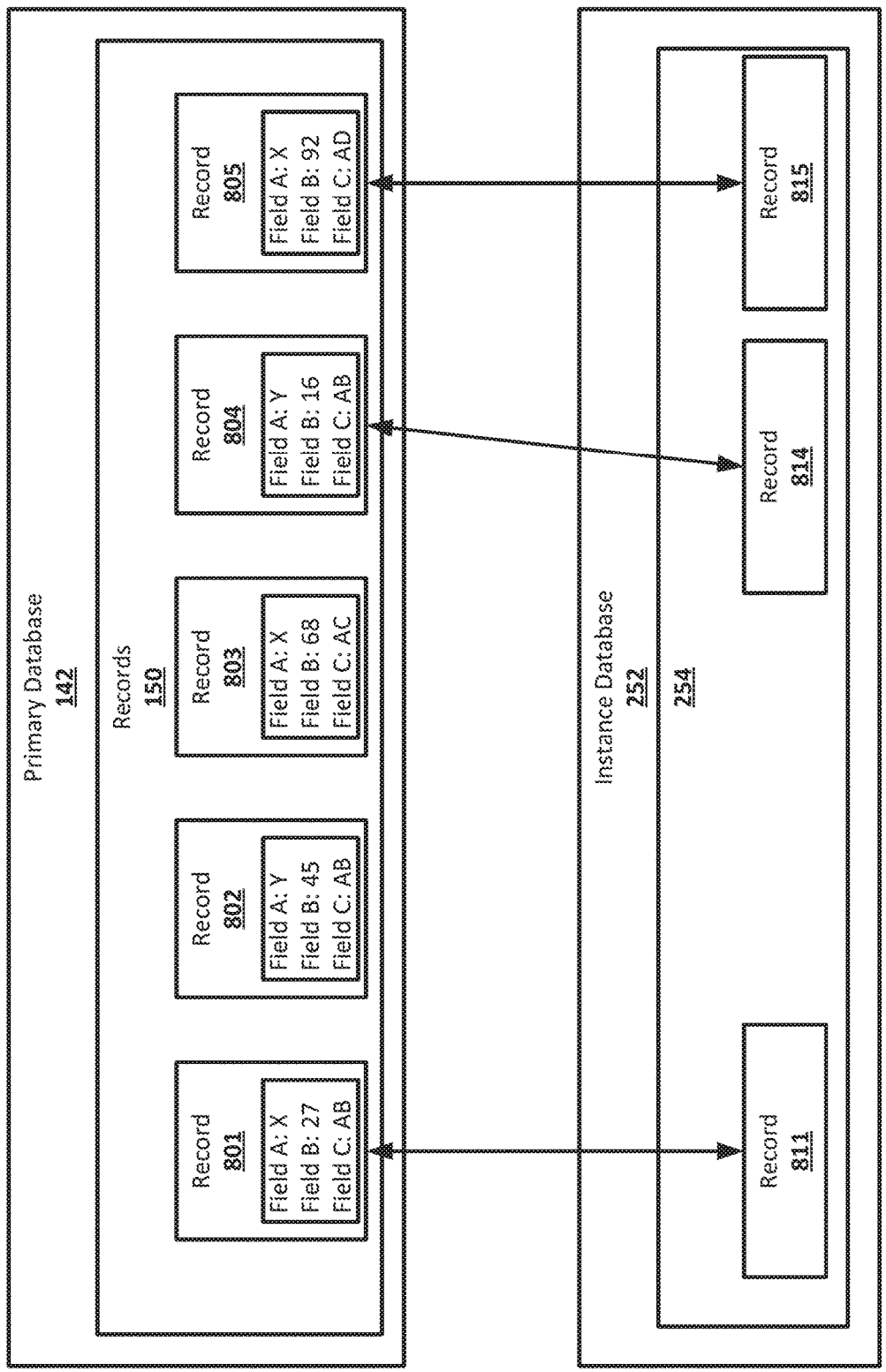
FIG. 8 shows an example arrangement for access to data in multiple instances through a single record according to an implementation of the disclosed subject matter.

FIG. 8 shows an example arrangement for access to data in multiple instances through a single record according to an implementation of the disclosed subject matter. Some records in an instance database, such as the primary database 142, may be linked to records in the instance database 252, while other records in the primary database 154 may not be linked to records in the instance database. For example, the record 801 in the primary database 142 may be linked to the record 811 in the instance database 252, the record 804 in the primary database 142 may be linked to the record 814 in the instance database 252, and the record 805 in the primary database 142 may be linked to the record 815 in the instance database 252, while the record 802 and the record 803 may not be linked to any record in the instance database 252. Records may be synchronized between the primary database 142 and the instance database 252. During synchronization data between linked records, such as the record 801 and the record 811, may be synchronized, for example, with data from one of the linked records being written to the other of the linked records to ensure that any aspects, or fields, in common between linked records include matching values. Synchronization may also write new records to a database, for example, when a new record has been added the primary database 142 and is not currently linked to a record in the instance database 252.

Figure 9:
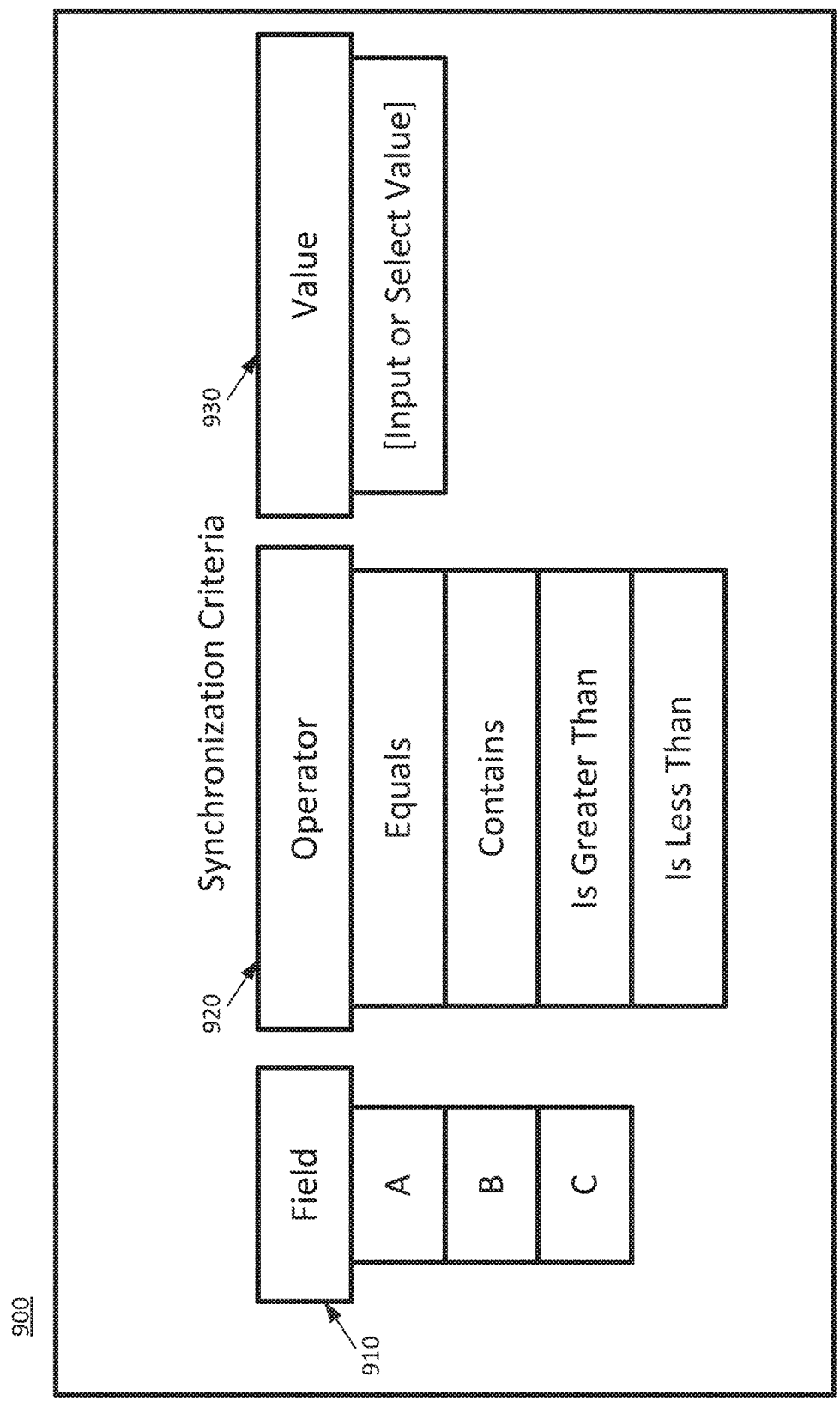
FIG. 9 shows an example user interface for access to data in multiple instances through a single record according to an implementation of the disclosed subject matter.

FIG. 9 shows an example user interface for access to data in multiple instances through a single record according to an implementation of the disclosed subject matter. A user interface 900 may allow a user to set criteria for selective synchronization of records. The user interface 900 may be, for example, a web-based interface accessed through any suitable web browser and hosted on the primary database system 100, the secondary database system 200, or on a separate server system, or may be, for example, an application-based interface which may be accessed using, for example, a client application that may connect to the primary application 110 or an instance of the secondary application such as the secondary application instance 220.

Synchronization criteria may be set through the selection of a field using field control 910, an operator using operator control 920, and a value using value control 930. The field control 910 may allow a user to select a field for the criteria from the fields that may be available in the records stored in the instance databases of the secondary database system 200. For example, records, such as the record 801, may include three fields, field A, field B, and field C, which may store values within the record. The operator control 920 may allow a user to select an operator for the criteria from a list of operators, such as, for example, "equals", "contains", "is greater than", "is less than", or any other suitable operator that may be used in a comparison between values. The value control 930 may allow a user to select or input a value to use with the criteria. The value may be selected from a list of values that may include values stored by the records in the instance databases in the field selected with the field control 910. The value may also be input manually by the user. For example, if the field control 910 is used to select field C, the value control 930 may list the values AB, AC, AD.

The criteria set by a user may be, for example, that the value in the field of the record selected with the field control 910 has the relationship defined by the operator selected with the operator control 920 with the value selected or input with the value control 930. For example, if the field control 910 is used to select field A, the operator control 920 is used to select "equals", and the value control 930 is used to input "X", the criteria may be "Field A=X".

The user interface 900 may be used to input any number of criteria. In some implementations, records in the primary database 142 may be of different types, and different criteria may be set for different record types. Some record types may have no criteria set, which may indicate that those record types are either always synchronized or never synchronized, depending, for example, on a selection made by the user of a default synchronization setting used by the primary database 142.

Figure 10:
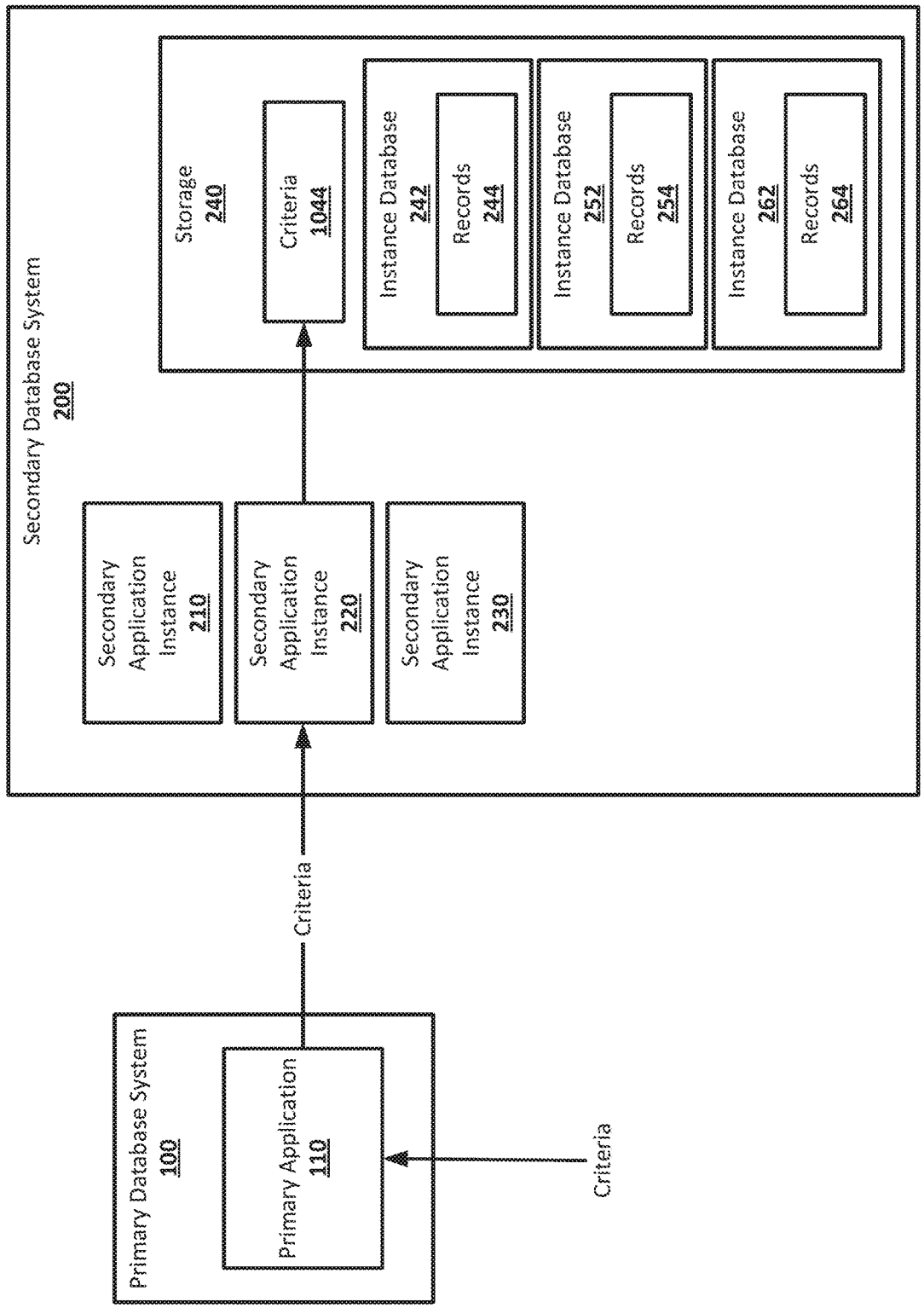
FIG. 10 shows an example arrangement for access to data in multiple instances through a single record according to an implementation of the disclosed subject matter.

FIG. 10 shows an example arrangement for access to data in multiple instances through a single record according to an implementation of the disclosed subject matter. Criteria entered by a user may be stored in the storage 240 of the secondary database system 200. For example, the user interface 900 may be a front-end interface for the primary application 110. After the criteria is entered by the user, the primary application 110 may transmit the criteria to an instance of the secondary application, such as the secondary application instance 220. The secondary application instance 220 may store the criteria in the storage 240 as the criteria 1044. In some implementations, the criteria may be stored on the primary database system 100, or may be stored in an instance database, such as the instance database 242.

Figure 11:
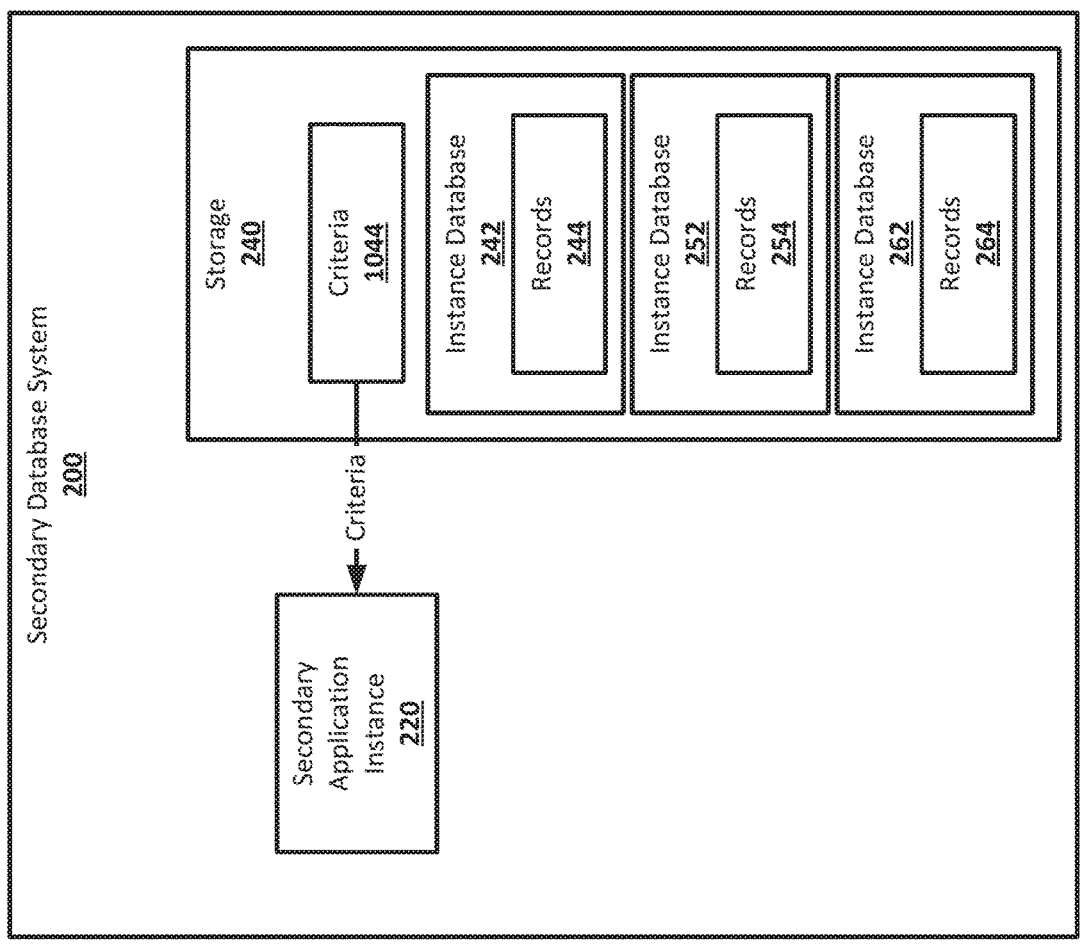
FIG. 11 shows an example arrangement for access to data in multiple instances through a single record according to an implementation of the disclosed subject matter.

FIG. 11 shows an example arrangement for access to data in multiple instances through a single record according to an implementation of the disclosed subject matter. The primary database 142 and instance databases 242, 252, and 262 may be synchronized. The synchronization may occur at regular timed intervals, set times, or based on the occurrence of specified events. The synchronization may be performed by a component of the secondary database system 200, such as instances of the secondary application. For example, the secondary application instance 220 may perform synchronization on its associated instance database 252. Before beginning the synchronization, the secondary application instance 220 may receive the criteria 1044 from the storage 240. In some implementations, synchronization may be performed by another software component of the secondary database system 200, such as, for example, a specialized synchronization component of the secondary application that may run independently of the instances of the secondary application associated with instance databases, for example, running as its own instance of the secondary application. The specialized component may receive the criteria 1044 from the storage 240 before performing synchronization. In some implementations, the criteria 1044 may be received by the primary application 110, which may control access to the records 150 in the primary database 142 by an instance or component of the secondary application that performs synchronization.

FIG. 12A shows an example arrangement for access to data in multiple instances through a single record according to an implementation of the disclosed subject matter. While performing synchronization between the records 254 in the instance database 252 and the records 150 in the primary database 142, the secondary application instance 220 may only synchronize records that meet the criteria for synchronization, such as the criteria 1044. For example, the criteria 1044 may be "Field A=X", which may indicate that only those records in the primary database 142 with a value of "X" in their field A will be synchronized with the instance database 252. Whether the record 801 in the primary database 142 meets the criteria 1044 may be checked by, for example, the secondary application instance 220, or by the primary application 110. The record 801 may meet the criteria 1044 and may be synchronized with the record 811 in the instance database 252. The secondary application instance 220 may pull any record data for synchronization from the record 801 to the record 811 and may push any record data for synchronization from the record 811 to the record 801.

Figure 12B:
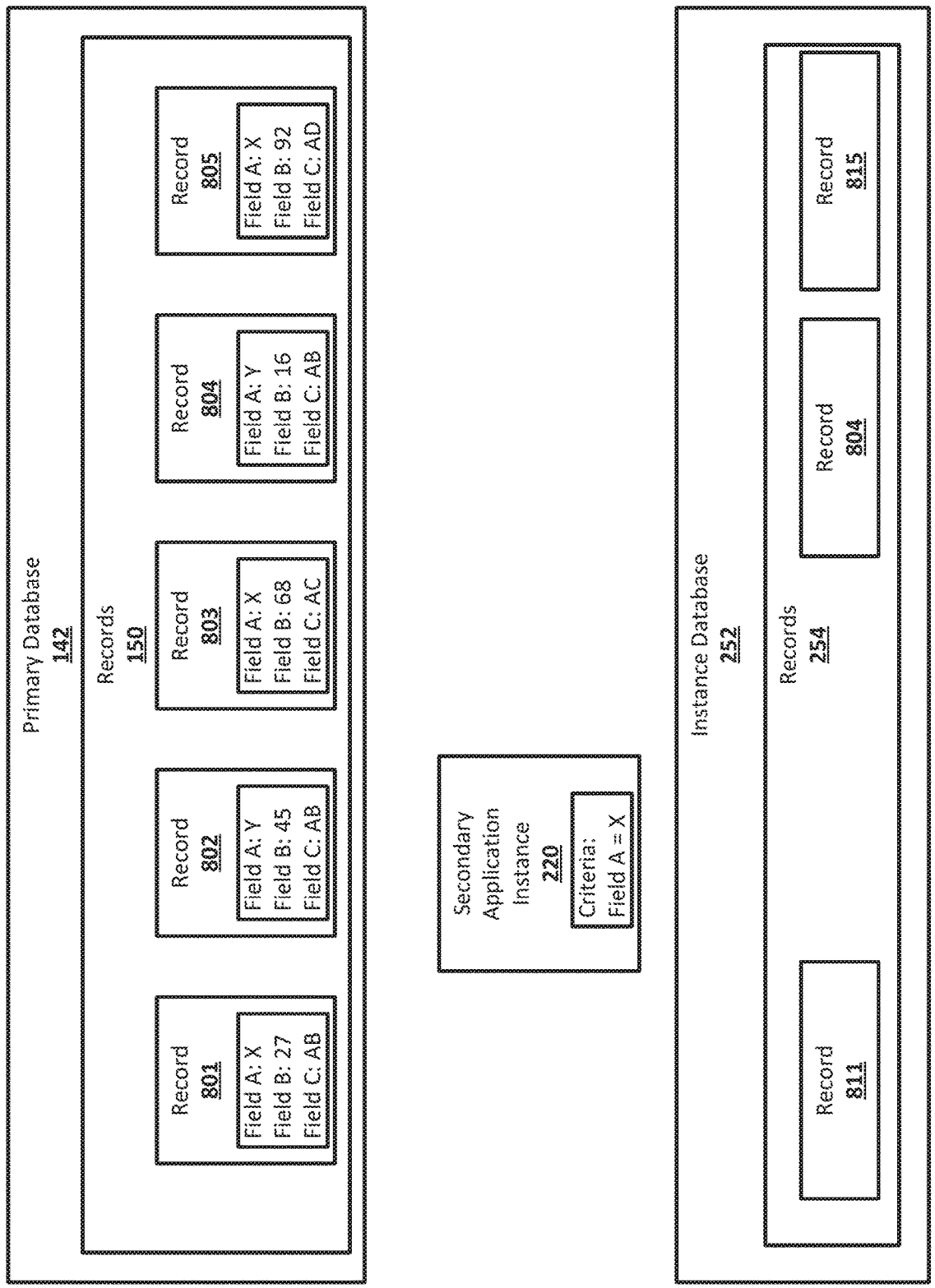
FIG. 12B shows an example arrangement for access to data in multiple instances through a single record according to an implementation of the disclosed subject matter

FIG. 12B shows an example arrangement for access to data in multiple instances through a single record according to an implementation of the disclosed subject matter. Whether the record 802 in the primary database 142 meets the criteria 1044 may be checked by, for example, the secondary application instance 220, or by the primary application 110. The record 802 may not meet the criteria 1044 and may not be synchronized with the instance database 252. For example, if the primary application 110 determines that the record 802 does not meet the criteria 1044, the primary application 110 may hide the record 802 from the secondary application instance 220, so that it is not visible to the secondary application instance 220. The secondary application 220 may thus not create a record in the instance database 252 to link to the record 802.

Figure 12C:
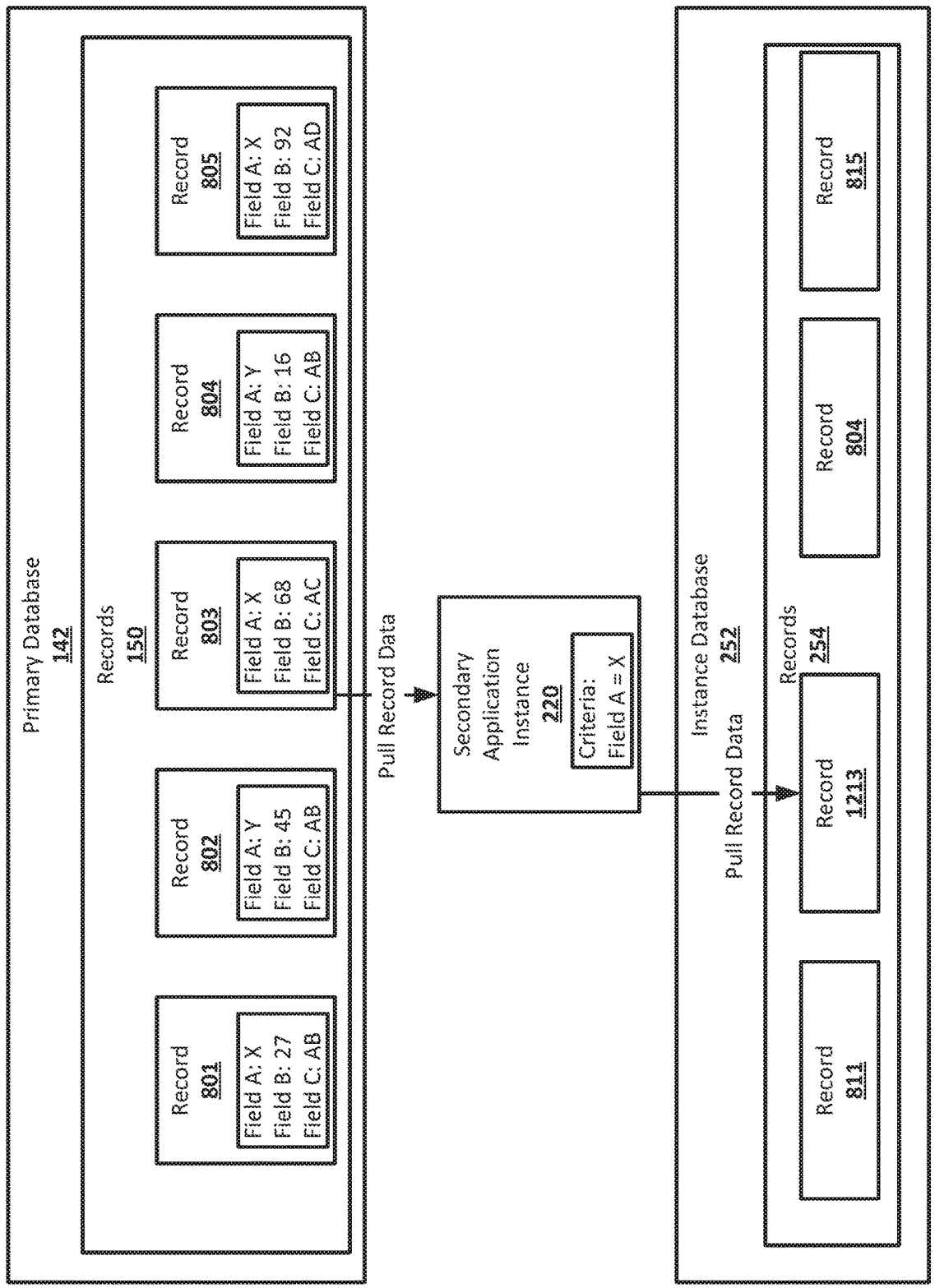
FIG. 12C shows an example arrangement for access to data in multiple instances through a single record according to an implementation of the disclosed subject matter

FIG. 12C shows an example arrangement for access to data in multiple instances through a single record according to an implementation of the disclosed subject matter. Whether the record 803 in the primary database 142 meets the criteria 1044 may be checked by, for example, the secondary application instance 220, or by the primary application 110. The record 803 may meet the criteria 1044 and may be synchronized with the instance database 252. The secondary application instance 220 create a record 1213 in the instance database 252 that is linked to the record 803. The secondary application instance 220 may pull record data from the record 803 to create the record 1213, filling in the common fields between the records with the record data from the record 803.

Figure 12D:
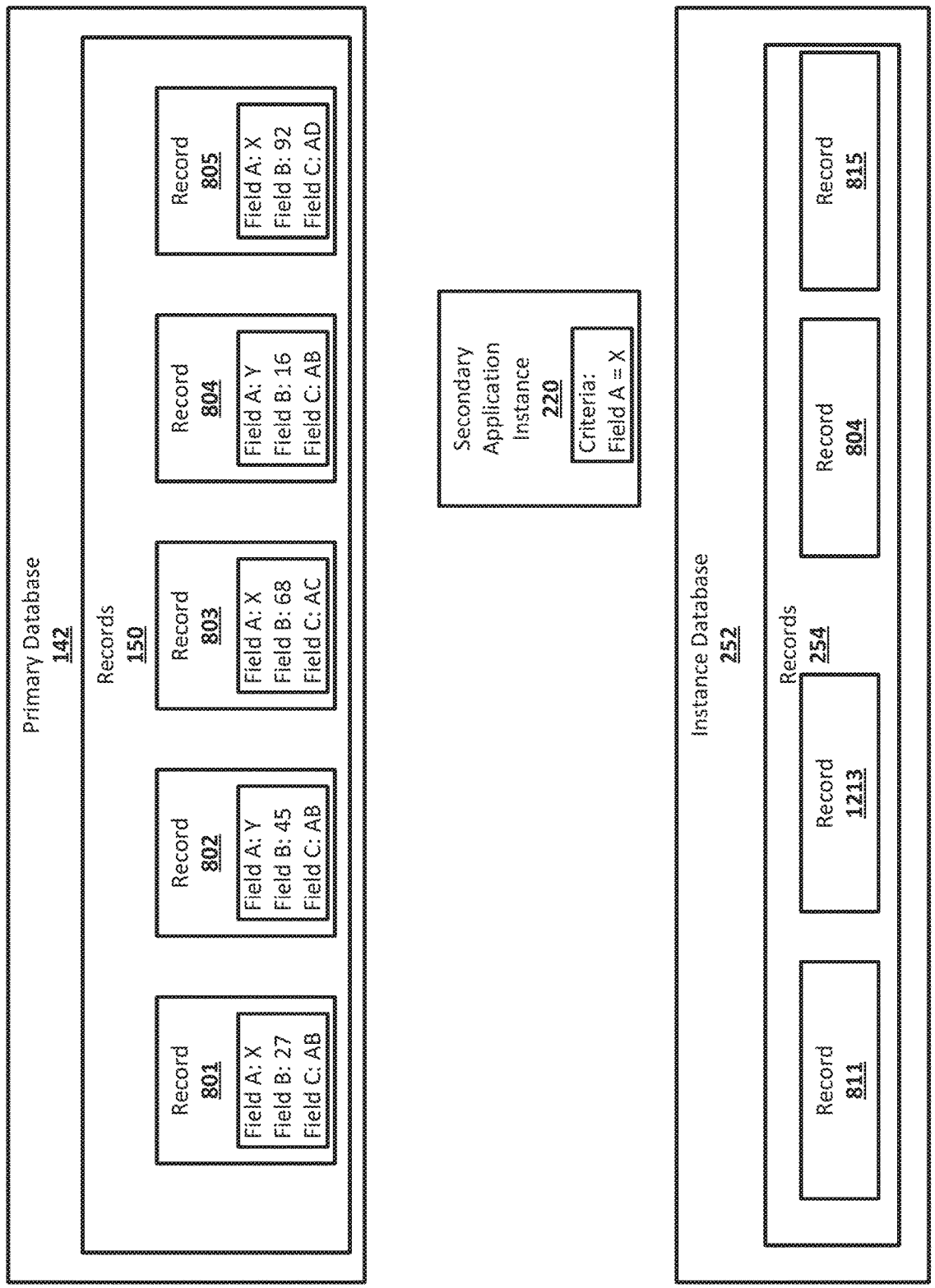
FIG. 12D shows an example arrangement for access to data in multiple instances through a single record according to an implementation of the disclosed subject matter

FIG. 12D shows an example arrangement for access to data in multiple instances through a single record according to an implementation of the disclosed subject matter. Whether the record 804 in the primary database 142 meets the criteria 1044 may be checked by, for example, the secondary application instance 220, or by the primary application 110. The record 804 may not meet the criteria 1044 and may not be synchronized with the record 814 in the instance database 252. For example, if the primary application 110 determines that the record 802 does not meet the criteria 1044, the primary application 110 may hide the record 802 from the secondary application instance 220, so that it is not visible to the secondary application instance 220. The secondary application 220 may thus not synchronize record data between the record 804 and record 814.

Figure 12E:
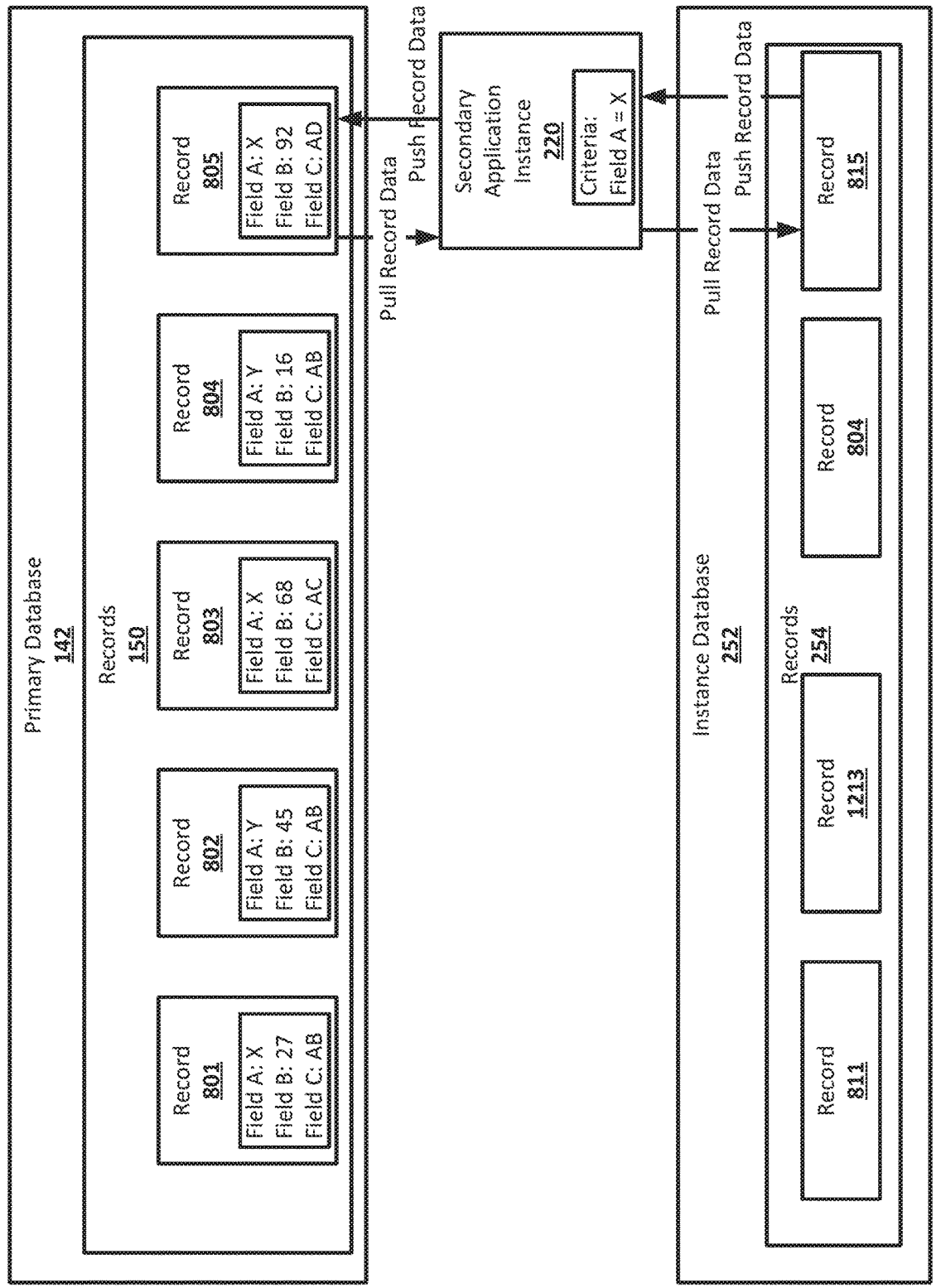
FIG. 12E shows an example arrangement for access to data in multiple instances through a single record according to an implementation of the disclosed subject matter

FIG. 12E shows an example arrangement for access to data in multiple instances through a single record according to an implementation of the disclosed subject matter. Whether the record 801 in the primary database 142 meets the criteria 1044 may be checked by, for example, the secondary application instance 220, or by the primary application 110. The record 805 may meet the criteria 1044 and may be synchronized with the record 815 in the instance database 252. The secondary application instance 220 may pull any record data for synchronization from the record 801 to the record 811 and may push any record data for synchronization from the record 811 to the record 801.

Figure 13:
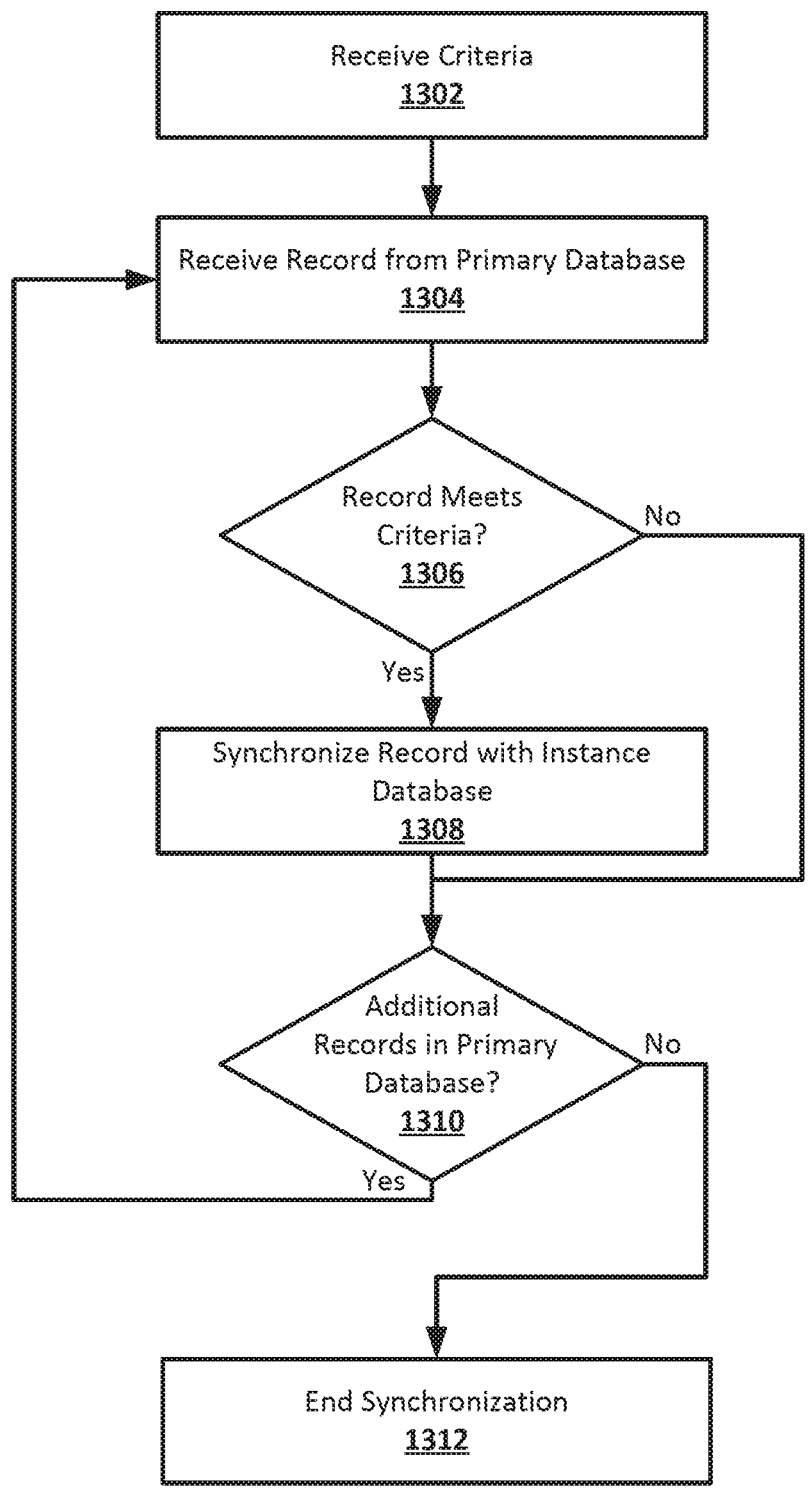
FIG. 13 shows an example procedure suitable for access to data in multiple instances through a single record according to an implementation of the disclosed subject matter.

FIG. 13 shows an example procedure suitable for access to data in multiple instances through a single record according to an implementation of the disclosed subject matter. At 1302, criteria may be received. For example, when starting synchronization between the primary database 142 and the instance database 252, the criteria 1044 may be received by the secondary application instance 220, the primary application 110, or any other component responsible for performing synchronization. The criteria 244 may be a criteria for selective synchronization set by a user, for example, using the user interface 900.

At 1304, a record may be received from the primary database. For example, the record 801 may be received from the primary database 142 by the primary application 110 or the secondary application instance 220 to be checked to determine whether the record 801 meets the criteria 1044.

At 1306, if the record meets the criteria, flow proceeds to 1308, otherwise the record does not meet the criteria, and flow proceeds to 1310. For example, the criteria 1044 may be "Field A=X". The value in field A of record 801 may be "X", so record 801 may meet the criteria 1044. Flow may proceed to 1308, where the record 801 may be synchronized with the record 811. The value in field A of record 802 may be "Y", so record 802 may not meet the criteria 1044. Flow may proceed to 1310, where the primary database 142 may be checked for additional records. The record 802 may not be synchronized with the instance database 252, and may be, for example, hidden from the secondary application instance 220 by the primary application 110.

At 1308, a record may be synchronized with an instance database. For example, the record 801 may meet the criteria 1044, and may be synchronized with the record 811 in the instance database 252 by pulling data from the record 801 to the record 811 and/or pushing data from the record 811 to the record 801. The record 803 may meet the criteria 1044 and may be synchronized with the instance database 252 by creating a record 1213 in the instance database 252. The record 1213 may be linked to the record 803 and may be filled with record data pulled from the record 803.

At 1310, the primary database may be checked for additional records. If there are additional records in the primary database, flow may proceed back to the 1304, where the record may be received before being checked to determine if it meets the criteria. If there are no additional records in the primary database, flow may proceed to 1312 and the synchronization may end.

At 1312, the synchronization may end. All records in the primary database 142 may have been checked to determine if they meet the criteria 1044 for selective synchronization, and all records that met the criteria 1044 may have been synchronized with the instance database 252. The synchronization may end.

Figure 14:
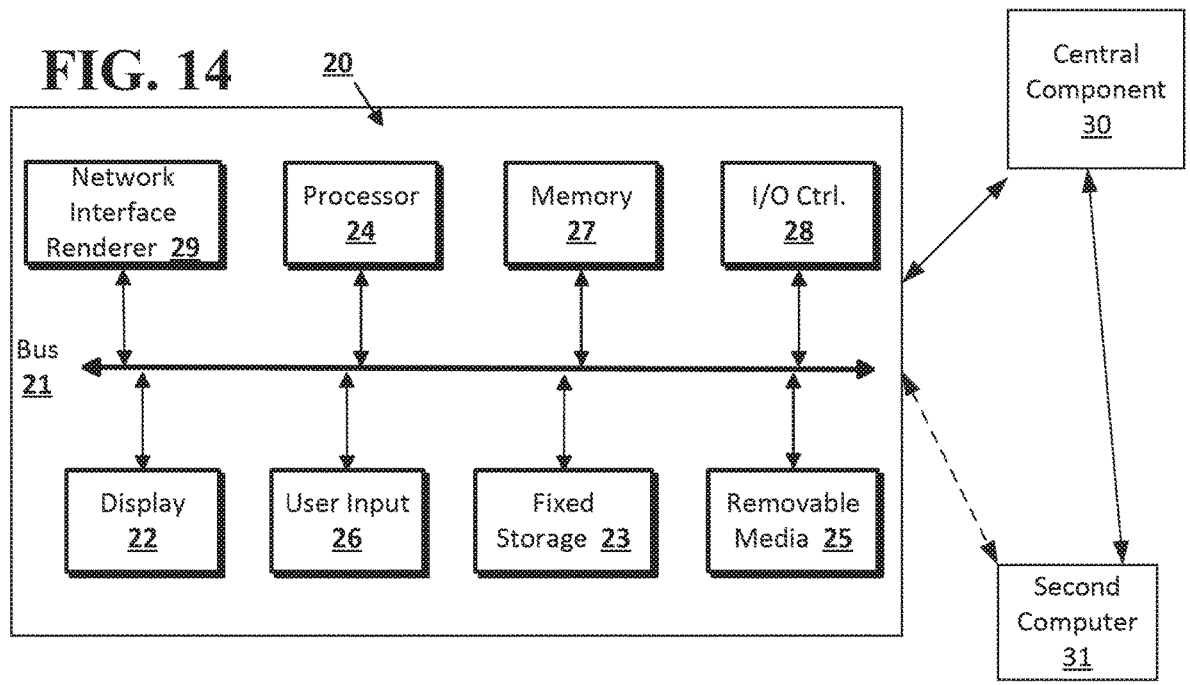
FIG. 14 shows a computer according to an implementation of the disclosed subject matter.

Implementations of the presently disclosed subject matter may be implemented in and used with a variety of component and network architectures. FIG. 14 is an example computer 20 suitable for implementing implementations of the presently disclosed subject matter. As discussed in further detail herein, the computer 20 may be a single computer in a network of multiple computers. As shown in FIG. 14, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 15.

Many other devices or components (not shown) may be connected in a similar manner (e.g., document scanners, digital cameras and so on). Conversely, all of the components shown in FIG. 14 need not be present to practice the present disclosure. The components can be interconnected in different ways from that shown. The operation of a computer such as that shown in FIG. 14 is readily known in the art and is not discussed in detail in this application. Code to implement the present disclosure can be stored in computer-readable storage media such as one or more of the memory 27, fixed storage 23, removable media 25, or on a remote storage location.

Figure 15:
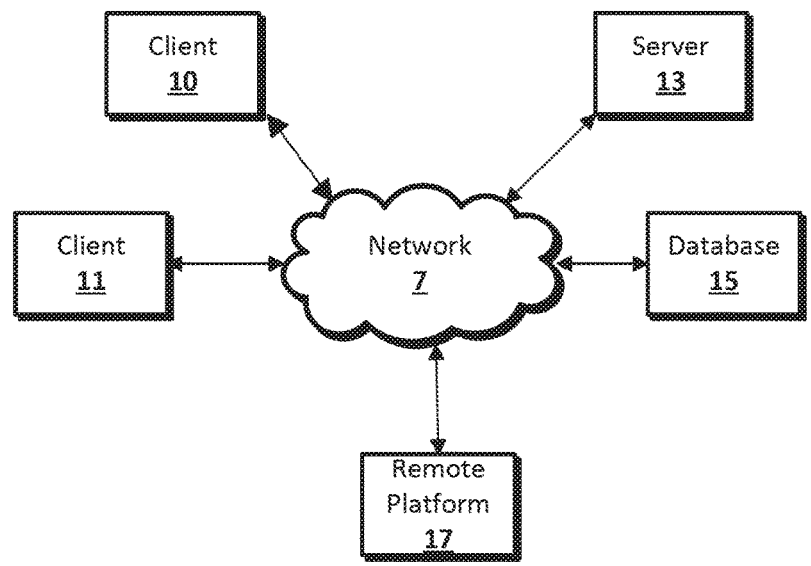
FIG. 15 shows a network configuration according to an implementation of the disclosed subject matter.

FIG. 15 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
    receiving by a primary application a selection of a record through a user interface of the primary application, wherein the record is stored in a first database that is associated with the primary application;
    receiving by the primary application one or more aspects of the record from the first database;
    displaying by the primary application on the user interface of the primary application at least one of the one or more aspects of the record;
    opening, by the primary application, a session with a first instance of a secondary application using at least one credential associated with access to the user interface;
    receiving by the primary application from a first instance database associated with the first instance of the secondary application a first additional aspect associated with the record from the first database;
    displaying by the primary application on the user interface of the primary application the first additional aspect associated with the record from the first database;
    receiving by the primary application through the user interface of the primary application a selection to switch to a second instance of the secondary application;
    in response to receiving the selection to switch to the second instance of the secondary application: closing by the primary application the session with the first instance of the secondary application, opening by the primary application a session with the second instance of the secondary application using at least one credential associated with access to the user interface, and receiving by the primary application from a second instance database associated with the second instance of the secondary application, a second additional aspect associated with the record from the first database; and
    displaying by the primary application on the user interface of the primary application the second additional aspect associated with the record from the first database in place of the first additional aspect associated with the record from the first database.

2. The computer-implemented method of claim 1, wherein the user interface is a front-end for the first database.

3. The computer-implemented method of claim 1, wherein the first database is part of a first database system that is multi-tenanted, and wherein the first instance database and second instance database are part of a secondary database system.

4. The computer-implemented method of claim 1, wherein the record is a contact record.

5. The computer-implemented method of claim 1, wherein the first additional aspect associated with the record from the first database is stored in a record in the first instance database that is linked to the record from the first database.

6. The computer-implemented method of claim 1, wherein the second additional aspect associated with the record from the first database is stored in a record in the second instance database that is linked to the record from the first database.

7. The computer-implemented method of claim 1, wherein the record from the first database is a contact record comprising contact information for an individual, the first additional aspect associated with the record from the first database is stored in a record in the first instance database that is linked to the record from the first database wherein the record from the first instance database is a prospect record comprising data related to the individual for a first business unit of an organization, and the second additional aspect associated with the record from the first database is stored in a record in the second instance database that is linked to the record from the first database wherein the record from the second instance database is a prospect record comprising data related to the individual for a second business unit of the organization.

8. A computer-implemented system for access to data in multiple instances through a single record comprising:
    one or more storage devices; and
    a processor that receives a selection of a record with a primary application through a user interface of the primary application, wherein the record is stored in a first database that is associated with the primary application in the one or more storage devices, receives with the primary application one or more aspects of the record from the first database, displays with the primary application on the user interface of the primary application at least one of the one or more aspects of the record, receives with the primary application from a first instance database associated with a first instance of a secondary application a first additional aspect associated with the record from the first database, displays with the primary application on the user interface of the primary application the first additional aspect associated with the record from the first database, receives with the primary application through the user interface of the primary application a selection to switch to a second instance of the secondary application, in response to receiving the selection to switch to the second instance of the secondary application closes with the primary application the session with the first instance of the secondary application, opens, with the primary application, a session with the second instance of the secondary application using at least one credential associated with access to the user interface, and receives with the primary application from a second instance database associated with the second instance of the secondary application a second additional aspect associated with the record from the first database, and displays with the primary application on the user interface of the primary application the second additional aspect associated with the record from the first database in place of the first additional aspect associated with the record from the first database.

9. The computer-implemented system of claim 8, wherein the user interface is a front-end for the first database.

10. The computer-implemented system of claim 8, wherein the first database is part of a first database system that is multi-tenanted, and wherein the first instance database and second instance database are part of a secondary database system.

11. The computer-implemented system of claim 8, wherein the record is a contact record.

12. The computer-implemented system of claim 8, wherein the first additional aspect associated with the record from the first database is stored in a record in the first instance database that is linked to the record from the first database.

13. The computer-implemented system of claim 8, wherein the second additional aspect associated with the record from the first database is stored in a record in the second instance database that is linked to the record from the first database.

14. The computer-implemented system of claim 8, wherein the record from the first database is a contact record comprising contact information for an individual, the first additional aspect associated with the record from the first database is stored in a record in the first instance database that is linked to the record from the first database wherein the record from the first instance database is a prospect record comprising data related to the individual for a first business unit of an organization, and the second additional aspect associated with the record from the first database is stored in a record in the second instance database that is linked to the record from the first database wherein the record from the second instance database is a prospect record comprising data related to the individual for a second business unit of the organization.

15. A system comprising: one or more computers and one or more storage devices storing instructions which are operable, when executed by the one or more computers, to cause the one or more computers to perform operations comprising:
   receiving by a primary application a selection of a record through a user interface of the primary application, wherein the record is stored in a first database that is associated with the primary application;
   receiving by the primary application one or more aspects of the record from the first database;
   displaying by the primary application on the user interface of the primary application at least one of the one or more aspects of the record;
   opening, by the primary application, a session with a first instance of a secondary application using at least one credential associated with access to the user interface;
   receiving by the primary application from a first instance database associated with the first instance of the secondary application a first additional aspect associated with the record from the first database;
   displaying by the primary application on the user interface of the primary application the first additional aspect associated with the record from the first database;
   receiving by the primary application through the user interface of the primary application a selection to switch to a second instance of the secondary application;
   in response to receiving the selection to switch to the second instance of the secondary application: closing by the primary application the session with the first instance of the secondary application, opening by the primary application a session with the second instance of the secondary application using at least one credential associated with access to the user interface, and receiving by the primary application from a second instance database associated with the second instance of the secondary application, a second additional aspect associated with the record from the first database; and
   displaying by the primary application on the user interface of the primary application the second additional aspect associated with the record from the first database in place of the first additional aspect associated with the record from the first database.

16. The system of claim 15, wherein the instructions further cause the one or more computers to perform operations further comprising, in response to receiving through the user interface a selection to switch to a second instance of the secondary application:
   closing a session with the first instance of the secondary application; and
   opening a session with the second instance of the secondary application using at least one credential associated with access to the user interface.

* * * * *